(12) United States Patent
Kubota

(10) Patent No.: US 11,943,411 B2
(45) Date of Patent: Mar. 26, 2024

(54) STORAGE METHOD, STORAGE SYSTEM, READING DEVICE, AND IMAGE PROCESSING APPARATUS

(71) Applicant: SHARP KABUSHIKI KAISHA, Sakai (JP)

(72) Inventor: Kazuhisa Kubota, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/873,723

(22) Filed: Jul. 26, 2022

(65) Prior Publication Data

US 2023/0043984 A1 Feb. 9, 2023

(30) Foreign Application Priority Data

Aug. 4, 2021 (JP) .................................. 2021-128473

(51) Int. Cl.
*H04N 1/64* (2006.01)
*G06F 3/12* (2006.01)
*H04N 1/00* (2006.01)
*H04N 1/10* (2006.01)
*H04N 1/32* (2006.01)

(52) U.S. Cl.
CPC ............ *H04N 1/10* (2013.01); *G06F 3/1203* (2013.01); *G06F 3/126* (2013.01); *G06F 3/1284* (2013.01); *H04N 1/0009* (2013.01); *H04N 1/00127* (2013.01); *H04N 1/32432* (2013.01); *H04N 1/00148* (2013.01)

(58) Field of Classification Search
CPC ............ H04N 1/0009; H04N 1/00127; H04N 1/32432; H04N 1/00148; G06F 3/1203
USPC ............................ 358/1.15, 1.16, 505, 403
See application file for complete search history.

(56) References Cited

U.S. PATENT DOCUMENTS

| | | | | |
|---|---|---|---|---|
| 5,404,514 A | * | 4/1995 | Kageneck | G06F 16/313 707/E17.084 |
| 5,706,365 A | * | 1/1998 | Rangarajan | G06F 16/316 715/204 |
| 2009/0132590 A1 | * | 5/2009 | Huang | G06F 16/93 |

FOREIGN PATENT DOCUMENTS

JP 2004-185212 A 7/2004

\* cited by examiner

*Primary Examiner* — Jamares Q Washington
(74) *Attorney, Agent, or Firm* — ScienBiziP, P.C.

(57) ABSTRACT

According to an embodiment, a storage method includes: a step of generating scan data by scanning of a document with a reading device; a step of acquiring index information that is different from information that is based on the document; and a step of assigning the acquired index information to the scan data and storing the scan data to which the index information is assigned in a storage device.

11 Claims, 20 Drawing Sheets

FIG. 4

| MULTIFUNCTION PERIPHERAL ID | SCAN DATA ID | INDEX | STORAGE DEVICE ID | FILE ID | FILE GENERATION DATE |
|---|---|---|---|---|---|
| MFP01 | SCD001 | AAA | NAS01 | file0001 | 2020/07/10 |
| MFP01 | SCD002 | BBB CCC | NAS02 | file0002 | 2020/07/25 |
| ... | ... | ... | ... | ... | ... |
| MFP01 | SCD00a | AAA, BBB CCC, ABC CORPORATION | NAS0a | file000a | 2020/08/01 |
| ... | ... | ... | ... | ... | ... |
| MFP0n | SCD00n | TOKYO, ** WARD | NAS0n | File000n | 2020/mm/dd |

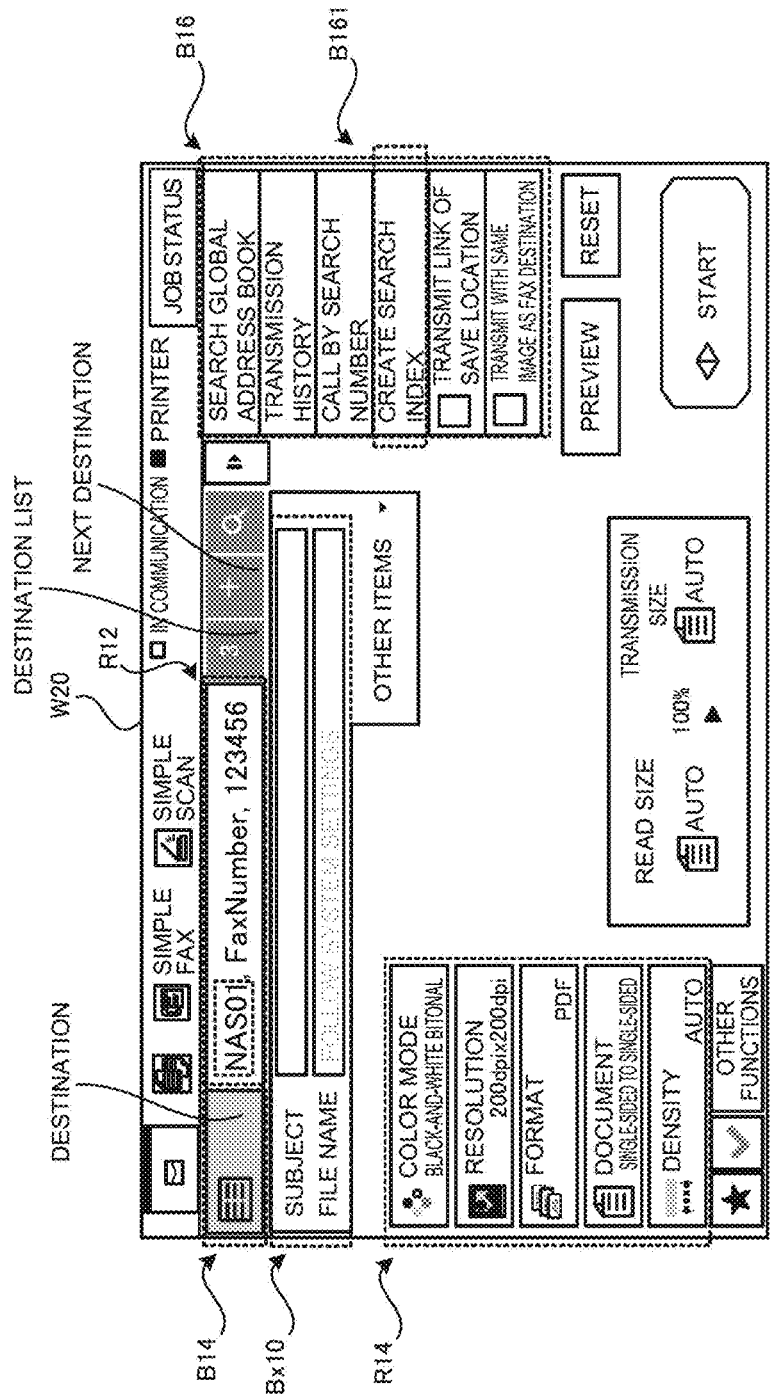

☐ IN COMMUNICATION ■ PRINTER JOB STATUS

INDEX ITEM B24 OK

- AAA
- BBB CCC
- ABC CORPORATION
- TOKYO, ** WARD
- US
- BUSINESS CONTACT
- USE

☐ IN COMMUNICATION ■ PRINTER JOB STATUS

START DATE B24 OK

2020 年 JULY

| SUN | MON | TUE | WED | THU | FRI | SAT |
|---|---|---|---|---|---|---|
|  |  |  | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | ** | 28 | 29 | 30 | 31 |  |

STORAGE METHOD, STORAGE SYSTEM, READING DEVICE, AND IMAGE PROCESSING APPARATUS

BACKGROUND OF THE INVENTION

Field of the Invention

The present disclosure relates to, for example, a storage method.

Description of the Background Art

As a method for performing a high-speed search for a scan file that is linked to a user from among scan files generated in large quantity by document scanning using a reading device, a common method is to assign index information (hereinafter referred to as an "index") to the scan files, and perform a search on the basis of the assigned index.

For example, there is known a technique to analyze the contents of file data, and generate candidates for a keyword as an index from a result of the analysis.

As is known, indexes are usually created on the basis of information held by the file itself, such as the file name, file contents (characters included in the file), and property information of the file.

Therefore, if a link is to be established by an index that is not derived from the file data (e.g., user information different from the file creator), performing the work such as rewriting the property information or specifying the folder of a save location of the file is necessary.

However, the work of rewriting the property information of a file is troublesome. Also, as regards the folder specification for the save location of a file, depending on the folder structure, the file needs to be duplicated. Thus, there is a problem of having to trouble the user. In addition, another problem is that the storage capacity of storage is strained when the files are needlessly duplicated.

An object of the present disclosure is to provide a storage method, for example, which enables the user operability to be improved in storage or search of a scan file, and with which a strain on the storage capacity of storage can be suppressed.

SUMMARY OF THE INVENTION

In order to solve the above problems, a storage method according to the present disclosure is characterized by including: a step of generating scan data by scanning of a document with a reading device; a step of acquiring index information that is different from information that is based on the document; and a step of assigning the acquired index information to the scan data and storing the scan data with the index information assigned thereto in a storage device.

Further, a storage system according to the present disclosure is provided with a reacting device including a reader and a controller, and a storage device, and is characterized in that: the reader generates scan data by scanning of a document; the controller acquires index information that is different from information that is based on the document, and assigns the acquired index information to the scan data and transmits the scan data with the index information assigned thereto to the storage device; and the storage device stores therein the scan data to which the index information is assigned.

Furthermore, a reading device according to the present disclosure is provided with a reader, a storage, and a controller, and is characterized in that: the reader generates scan data by scanning of a document; and the controller acquires index information that is different from information that is based on the document, and assigns the acquired index information to the scan data and stores the scan data with the index information assigned thereto in the storage.

Furthermore, an image processing apparatus according to the present disclosure is provided with a reader, a storage, an image processor, and a controller, and is characterized in that: the reader generates scan data by scanning of a document; the image processor performs predetermined image processing on the scan data; and the controller acquires index information that is different from information that is based on the document, and assigns the acquired index information to the scan data and stores the scan data with the index information assigned thereto in the storage.

According to the present disclosure, it is possible to provide a storage method, for example, which enables the user operability to be improved in storage or search of a scan file, and with which a strain on the storage capacity of storage can be suppressed.

BRIEF DESCRIPTION OF THE DRAWINGS

FIG. 4 is a table illustrating a data structure of an index management table.

FIG. 9 is a diagram illustrating an operation example according to the first embodiment.

FIGS. 14A and 14B are diagrams illustrating an operation example of the first embodiment.

DESCRIPTION OF THE PREFERRED EMBODIMENTS

Embodiments of the present disclosure will be described below with reference to the accompanying drawings. In the present disclosure, a multifunction peripheral which is capable of executing, for example, each function such as San to folder, Scan to E-mail, fax, copy, or print by a single housing will be described as one form of a reading device or an image processing apparatus. The following embodiments are presented as examples for explaining the present disclosure, and the technical scope of the description recited in the claims is not limited to matters described below.

1. First Embodiment

1.1 Overall Configuration

Figure 1:
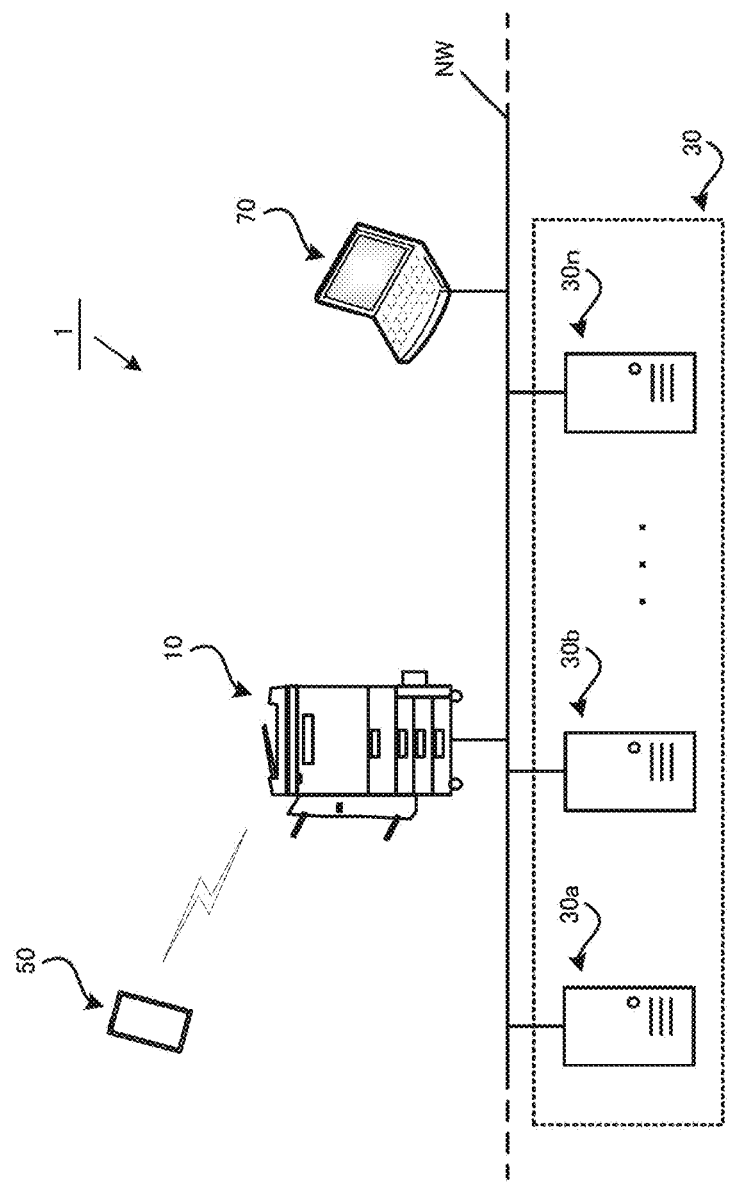
FIG. 1 is a diagram of an overall configuration of a storage system according to a first embodiment.

FIG. 1 is a diagram which schematically illustrates a configuration of a storage system 1 that implements a storage method according to the present disclosure. A multifunction peripheral 10 is connected to a storage device 30 (30a, 30b, ..., 30n) via a network NW. Here, the network NW refers to a structure in which at least two devices are connected to each other, and transmission of information between the devices is mutually enabled. The devices which perform communication via the network NW may be independent devices or may be internal blocks which constitute a single device.

The communication in the above includes not only wireless communication and wired communication, but also communication in which wireless communication and wired communication are mixed, such as communication in which wireless communication is performed in a certain zone and wired communication is performed in the other zones. Furthermore, it is also possible to adopt the form in which wired communication is performed for communication from one device to another device, and wireless communication is performed for communication in the opposite way.

As the specific modes of the network NW, a local area network (LAN), a wide area network (WAN), the Internet, a public line, and a fax line can be given as examples.

1.2 Functional Configuration 1.2.1 Regarding Multifunction Peripheral 10

Figure 2:
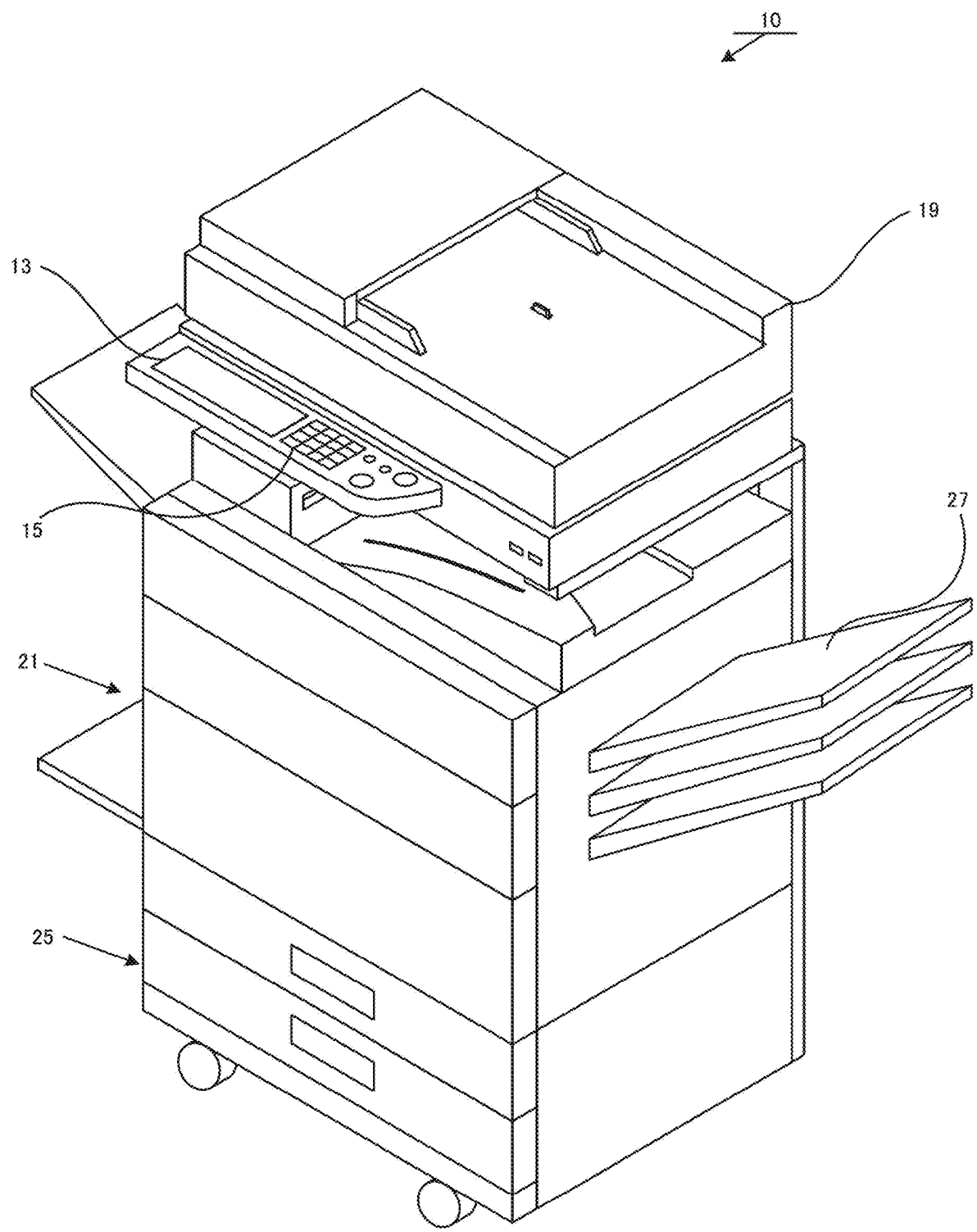
FIG. 2 is a perspective view illustrating an outer appearance of a multifunction peripheral.
Figure 3:
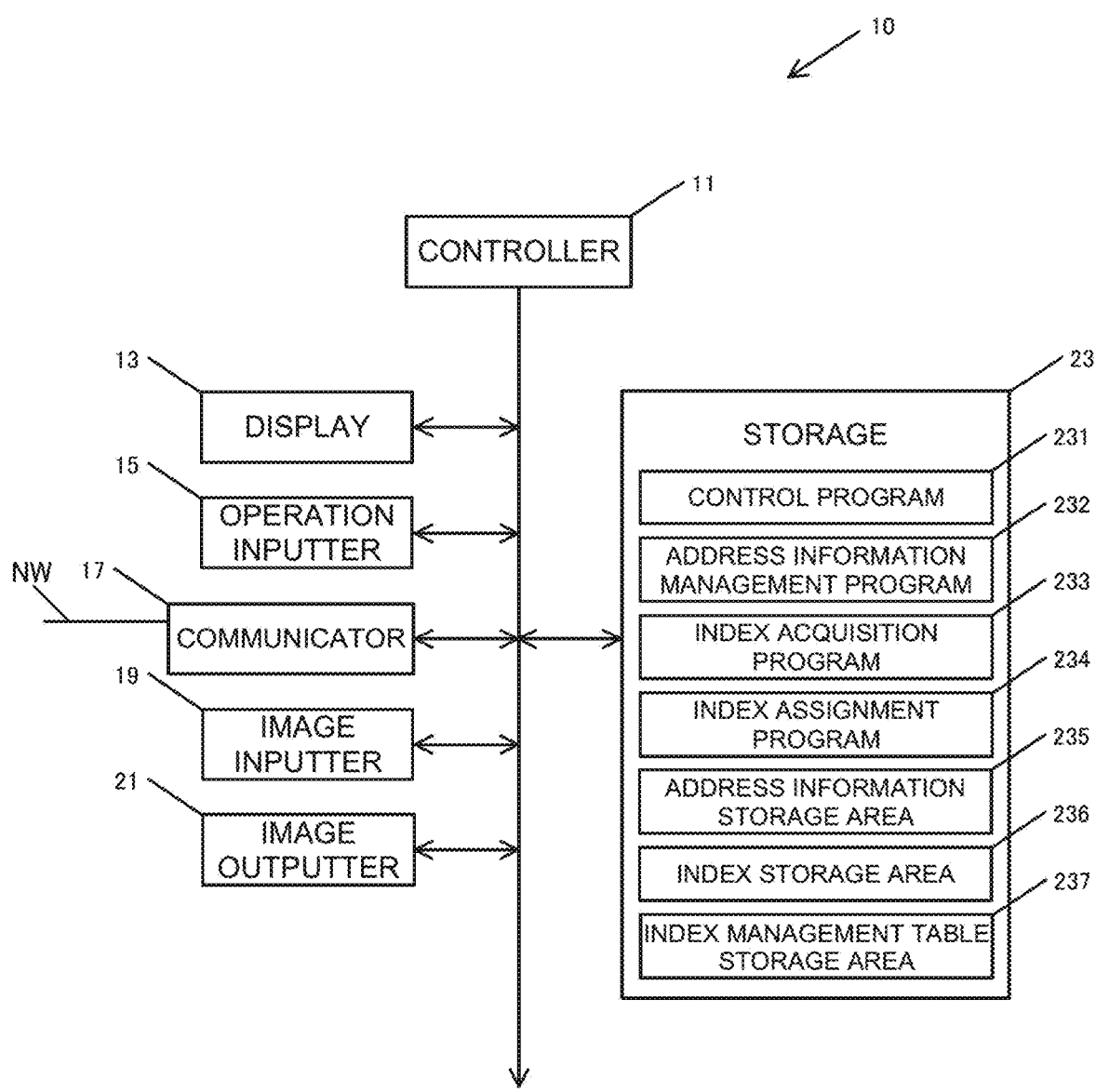
FIG. 3 is a diagram of a functional configuration of a multifunction peripheral according to the first embodiment.

FIG. 2 is a perspective view illustrating an outer appearance of the multifunction peripheral 10. FIG. 3 is a diagram illustrating a functional configuration of the multifunction peripheral 10. The multifunction peripheral 10 is provided with a controller 11, a display 13, an operation inputter 15, a communicator 17, an image inputter 19, an image outputter 21, and a storage 23.

The controller 11 performs overall control of the multifunction peripheral 10. The controller 11 is configured from, for example, one or more arithmetic devices (such as central processing units [CPUs]). The controller 11 reads and executes various programs stored in the storage 23, thereby implementing the function.

The display 13 displays various kinds of information to a user, for example. The display 13 can be composed of, for example, a liquid crystal display (LCD) or an organic electro-luminescence (EL) display.

The operation inputter 15 functions as an operation receiver which receives input of information from the user, for example. The operation inputter 15 can be configured from, for example, a hardware key (e.g., a numeric keypad), buttons, and the like. The operation inputter 15 can be configured as a touch panel that allows input via the display 13. In this case, for example, a method such as a resistive method, an infrared method, an electromagnetic induction method, or a capacitive sensing method may be employed as an input method for the touch panel.

The communicator 17 is provided with either of or both of wired communication/wireless communication interfaces to communicate with other devices via a network (NW), such as a LAN, a WAN, the Internet, a public line, or a fax line, for example.

The image inputter 19 receives input of a document or document data. When input of a document is to be received, the image inputter 19 can be configured as a reader (a scanner device) which scans and reads the document by an image sensor such as a charge-coupled device (CCD) or a contact image sensor (CIS), thereby generating scan data. In addition, the image inputter 19 can be configured from elements for inputting document data, such as connection ports of various devices, e.g., Universal Serial Bus (USB) and external serial ATA (eSATA) ports, card readers for various memory cards such as an SD card, or an interface for proximity (short-range) wireless communication. It is also possible to use the communicator 17, which communicates with other devices via the network NW and inputs the document data, as the image inputter 19.

The image outputter 21 functions as an image processor which outputs a document printout or document data. When making an output as a document printout, the image outputter 21 can be configured as an image former that forms an image based on image information on paper as a print medium. The image former can be configured from, for example, a laser printer using an electrophotographic method, in which case the image former forms an image by using toner as a color material. In addition, the image outputter 21 can be configured from elements for outputting the document data, such as connection ports of various devices e.g., USB and eSATA ports, card readers for various memory cards such as an SD card, or an interface for proximity (short-range) wireless communication. It is also possible to use the communicator 17, which communicates with other devices via the network NW and outputs the document data, as the image outputter 21.

The storage 23 stores therein various kinds of data and various programs necessary for operation of the multifunction peripheral 10. The storage 23 can be configured from, for example, storage devices such as a random-access memory (RAM), a hard disk drive (HDD), a solid state drive (SSD), and a read-only memory (ROM).

In a first embodiment, the storage 23 stores a control program 231, an address information management program 232, an index acquisition program 233, and an index assignment program 234, and reserves an address information storage area 235, an index storage area 236, and an index management table storage area 237.

The control program 231 is a program that the controller 11 reads when implementing each function such as the San to folder, Scan to E-mail, fax, copy, or print. The controller 11 that has read the control program 231 implements each function by controlling the display 13, the operation inputter 15, the communicator 17, the image inputter 19, the image outputter 21, and the like.

The address information management program 232 is a program that the controller 11 reads when managing address information stored in the address information storage area 235. The controller 11 that has read the address information management program 232 performs input processing, editing processing, deletion processing, etc., for an address book managed by the multifunction peripheral 10 itself as management information, or address information received from a terminal device 50 or an information processing apparatus 70 to be described later.

The index acquisition program 233 is a program that the controller 11 reads when acquiring an index. The controller 11 that has read the index acquisition program 233 acquires the index selected or input by the user. In the description of the present disclosure, index information assigned to scan data is referred to as an index. The index will be described later.

The index assignment program 234 is a program that the controller 11 reads when assigning the acquired index to scan data generated by the image inputter 19. The controller 11 that has read the index assignment program 234 assigns the acquired index to the scan data and transmits the indexed scan data to the storage device 30.

The address information storage area 235 is a storage area for storing the address book managed by the multifunction peripheral 10 itself as the management information, or the address information received from the terminal device 50 or the information processing apparatus 70 to be described later.

The index storage area 236 is a storage area for storing the index for which selection or input by the user is received. The index stored in the index storage area 236 is called by the controller 11 as appropriate.

The index management table storage area 237 is a storage area for storing an index management table to manage the scan data and the index assigned to this scan data in association with each other. The index management table storage area 237 stores, in addition to the scan data and the assigned index, identification information, etc., for identifying the storage device in which the scan data to which the index is assigned is stored as a scan file.

FIG. 4 is a table illustrating one form of a data structure of the index management table. The index management table includes multifunction peripheral ID, scan data ID, an index, storage device ID, file ID, and a file generation date.

The multifunction peripheral ID is identification information for identifying the multifunction peripheral 10 that has generated the scan data. The multifunction peripheral ID may be a specific character string representing the multifunction peripheral, e.g., a model name such as "MFP01" as exemplified in FIG. 4, a model, number, a serial number, or the name of a manufacturer, or may be identification information such as a media access control (MAC) address or an IP address representing the position on a network.

The scan data ID is identification information for identifying the generated scan data. The scan data ID is assigned each time the multifunction peripheral 10 generates scan data.

An index is information assigned in a state where a large number of scan files generated by scanning of documents, etc., are collected, analyzed, and saved, and in order to facilitate fast and accurate information retrieval, and is information assigned to scan data corresponding to the original data of such scan files. As a search engine assumes the scan files to which the index information is assigned as the files to be searched for, a fast and accurate search can be made for the objective scan file.

It is assumed that the first embodiment uses first information, which is related to address information including a name and destination information, as the management information managed by the multifunction peripheral 10, or second information, which is different from the first information, and corresponds to, for example, words and phrases registered in advance in the multifunction peripheral 10 or a character string directly input, as the index. For example, in the example illustrated in FIG. 4, the indexes "AAA" and "BBB CCC" represent the names included in the address information. More specifically, FIG. 4 indicates that a link is established by the name "AAA" being assigned, as an index, to data of scan data ID "SCD001", for example.

Also, for example, scan data ID "SCD00n" indicates that "Tokyo, ** Ward" is assigned as an example of the second information that is different from the first information.

The storage device ID is identification information for identifying the storage device 30, which is the transmission destination of the scan data.

The file ID is identification information for identifying the scan file corresponding to the scan data to which the index is assigned.

The file generation date represents the date of generation of the scan data to which the index is assigned.

1.2.2 Regarding Storage Device 30

The storage device 30 according to the present disclosure can be configured as an external storage device which stores scan data output and transmitted from the multifunction peripheral 10 as a scan file. A plurality of storage devices 30, such as the storage devices 30a, 30b, . . . , 30n, as exemplified in FIG. 1, can be provided, or the storage device 30 can be configured as a single storage device 30. As long as each storage device 30 is identifiable on the network NW, and is configured to be able to store scan data transmitted from the multifunction peripheral 10 as the scan file, no restrictions are imposed on the number of storage devices 30 to be installed and a functional configuration of the storage device 30. In the description provided below, the storage devices 30a to 30n are simply referred to as the storage device 30.

Figure 5:
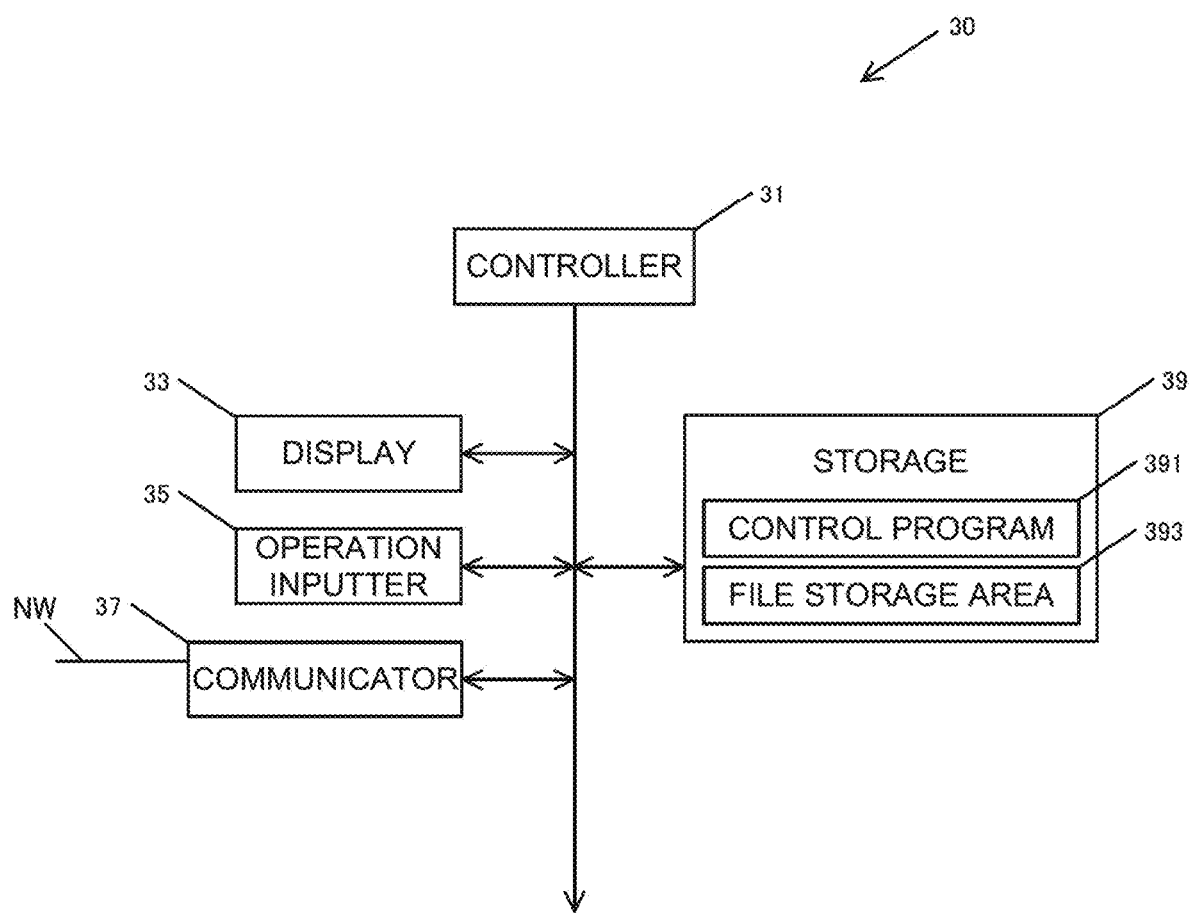
FIG. 5 is a diagram of a functional configuration of a storage device according to the first embodiment.

FIG. 5 is a diagram illustrating a functional configuration of the storage device 30. The storage device 30 includes a controller 31, a display 33, an operation inputter 35, a communicator 37, and a storage 39.

The controller 31 performs overall control of the storage device 30. The controller 31 is configured from, for example, one or more arithmetic devices (such as CPUs). The controller 31 reads and executes various programs stored in the storage 39, thereby implementing the function.

The display 33 displays various kinds of information to the user, for example. The display 33 can be composed of, for example, an LCD or an organic EL display.

The operation inputter 35 receives input of information by the user, for example. The operation inputter 35 can be configured from input means such as a keyboard, a mouse, and a numeric keypad, for example.

The communicator 37 is provided with either of or both of wired/wireless interfaces to communicate with other devices via a network (NW), such as a LAN, a WAN, the Internet, a public line, or a fax line, for example.

The storage 39 stores therein various kinds of data and various programs necessary for operation of the storage device 30. The storage 39 can be configured from, for example, storage devices such as a RAM, an HDD, an SSD, and a ROM.

In the first embodiment, the storage 39 stores a control program 391, and reserves a file storage area 393.

The control program 391 is a program that the controller 31 reads when implementing each function of the storage device 30. The controller 31 that has read the control program 391 implements each function by controlling the display 33, the operation inputter 35, the communicator 37, and the like.

The file storage area 393 is a storage area for storing scan data to which an index is assigned as a scan file.

Meanwhile, the storage system 1 can be configured to further include the terminal device 50, and the information processing apparatus 70, etc.

The terminal device 50 may be configured as a communication device such as a smartphone, a tablet, or a cellular phone. As long as the terminal device 50 is configured to enable communication with the multifunction peripheral 10, no restrictions are imposed on the functions of the terminal device 50. The terminal device 50 communicates with the multifunction peripheral 10 by means of, for example, proximity wireless communication of performing communication in such a state that housings of the multifunction peripheral 10 and the terminal device 50 are brought into contact with each other or brought into close proximity, or short-range wireless communication of performing communication in such a state that the housings of the multifunction peripheral 10 and the terminal device 50 are positioned within a short distance (for example, within several tens of meters or so) from each other. The terminal device 50 can also perform communication by these two types of wireless communications of the proximity wireless communication and the short-range wireless communication.

As the specific modes of the proximity wireless communication, Near Field Communication (NFC) using electromagnetic induction, such as a contactless integrated circuit (IC) card, can be given as an example. Further, as the specific modes of the short-range wireless communication, a Bluetooth (registered trademark) scheme or a Wi-Fi (registered trademark) scheme can be given as examples.

The terminal device 50 can transmit address information as the management information to the multifunction peripheral 10. The address information managed by terminal device 50 includes, for example, general management items such as a personal name (surname, first name, furigana (phonetic characters)), a phone number (home, cellular, place of work), an e-mail address, a fax number (home, place of work), an address (home, place of work), a zip code, a uniform resource locator (URL), a post, a place of work, classification, an image, and a memo. In addition to the above general management items, the address information may include a social networking service (SNS) account, an instant message (IM) account, and the like.

The information processing apparatus 70 can be configured as a personal computer capable of executing software, thereby executing various kinds of processing. As long as the information processing apparatus 70 is configured to enable communication with the multifunction peripheral 10 via a network (NW), no restrictions are imposed on the functions of the information processing apparatus 70. For example, business card management software, or address information management software similar to the business card management software is installed on the information processing apparatus 70. As the information processing apparatus 70 executes the software as mentioned above, for example, the information processing apparatus 70 can conduct management of the address information such as new input, edit, or deletion of an address.

As with the terminal device 50, the information processing apparatus 70 can transmit the address information as the management information to the multifunction peripheral 10.

The multifunction peripheral 10 which has received the address information from the terminal device 50 or the information processing apparatus 70 can add the received address information to the address book managed by the multifunction peripheral 10 itself, or perform an image transmission job or the like using the received address information.

1.3 Flow of Processing

Figure 6:
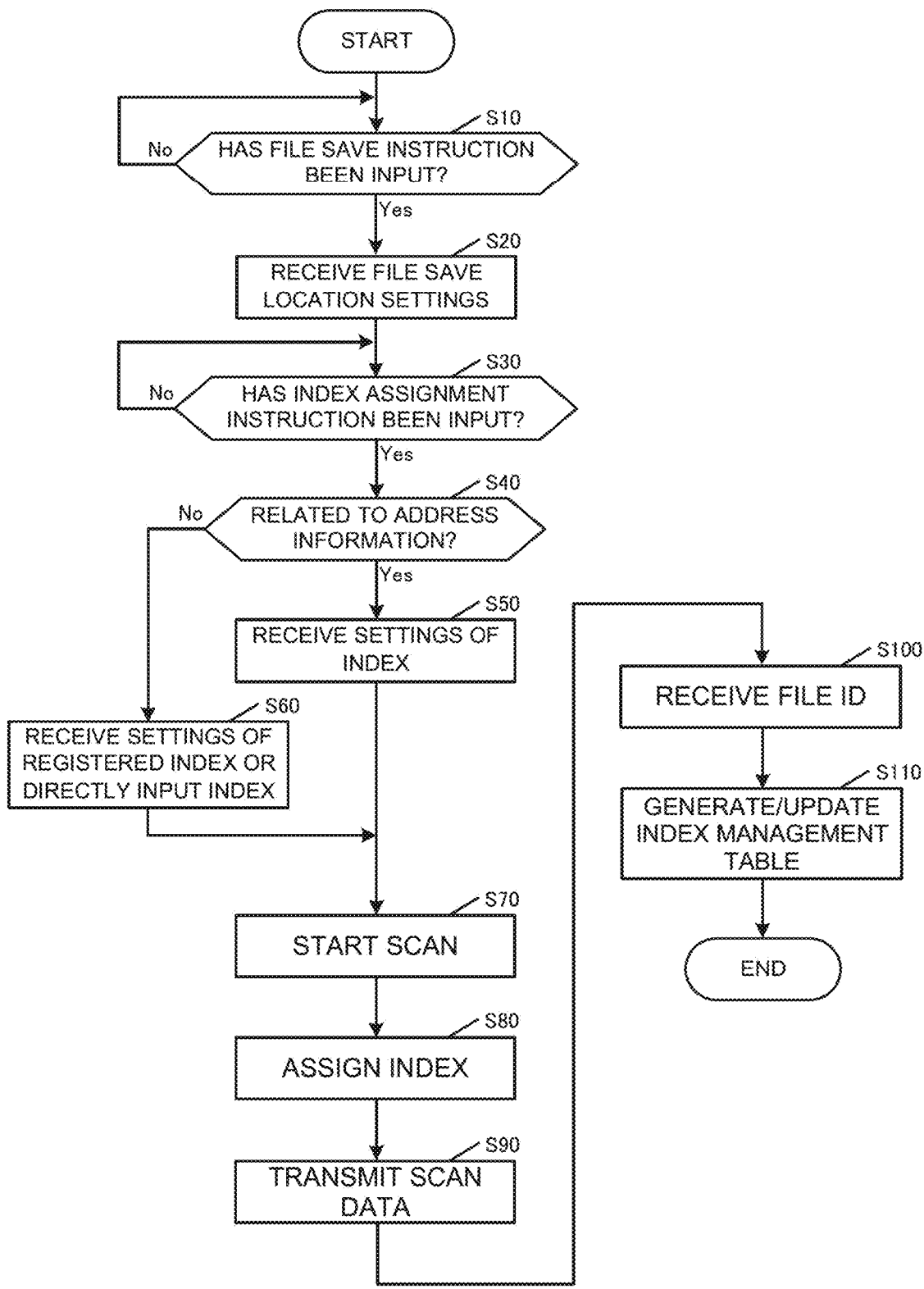
FIG. 6 is a diagram illustrating a flow of processing of the first embodiment.

Next, a flow of processing according to the first embodiment will be described. FIG. 6 is a flowchart illustrating the flow of processing of the multifunction peripheral 10. In the following, explanation will be given for a mode in which when the user wishes to use the first information related to address information as an index, the multifunction peripheral 10 assigns the index to scan data by using the address book managed by the multifunction peripheral 10 itself.

First, the controller 11 determines whether or not the user has input an instruction to save the scan file (step S10).

If it is determined by the controller 11 that the instruction to save the scan file has been input, the controller 11 receives save location settings for the scan file (if step S10 is Yes, then go to step S20). If it is determined by the controller 11 that no instruction to save the scan file has been input, the controller 11 waits until the save instruction is input (No in step S10).

When the controller 11 receives the save location settings for the scan file from the user, the controller 11 determines whether or not an instruction to assign the index has been input (move from step S20 to step S30).

When it is determined that the instruction to assign the index has been input, the controller 11 reads the index acquisition program 233. The controller 11 that has read the index acquisition program 233 determines whether or not the index corresponds to the first information related to address information (if step S30 is Yes, then go to step S40).

If it is determined that the index to be assigned corresponds to the first information related to address information, the controller 11 displays a selection screen to receive selection/input of the index, and receives settings of the index (if step S40 is Yes, then go to step S50).

Meanwhile, if it is determined that the index to be assigned does not correspond to the first information related to address information, the controller 11 displays a selection screen to receive selection/input of the second information as the index, and receives settings of the index (a registered index or a directly input index) (if step S40 is No, then go to step S60).

When the settings of the index are received, the controller 11 starts a scan (step S70).

Next, the controller 11 reads the index assignment program 234. The controller 11 that has read the index assignment program 234 assigns the index received in step S50 or step S60 to the generated scan data (step S80). Next, the controller 11 transmits the indexed scan data to the storage device 30 set as the scan file save location, which has been received in step S20 (step S90).

When the scan file is stored in the storage device 30, which is the transmission destination of the scan data, and a file ID is issued, the controller 11 receives the file ID (step S100).

Further, if an index management table is not generated, the controller 11 generates a relevant management table. Meanwhile, if an index management table has already been generated, the controller 11 updates the management table, and ends the processing (step S110).

Figure 7:
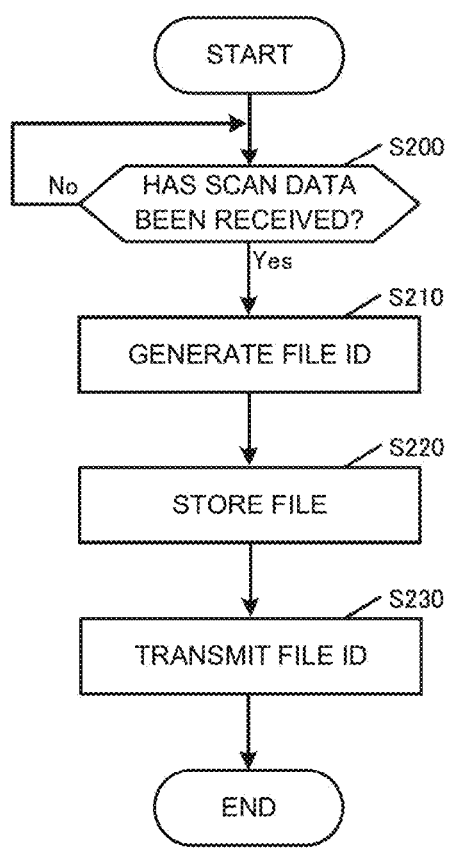
FIG. 7 is a diagram illustrating a flow of processing of the first embodiment.

Next, processing of the storage device 30 will be described with reference to the flowchart of FIG. 7. The processing in the storage device 30 will be described assuming that the processing is started at a timing when the scan data is transmitted from the multifunction peripheral 10 (step S90 in FIG. 6).

The controller 31 of the storage device 30 determines whether scan data has been received from the multifunction peripheral 10 (step S200).

If it is determined that the scan data has been received, the controller 31 generates a file ID of the scan file corresponding to the scan data in question (if step S200 is Yes, then go to step S210). Meanwhile, if it is determined that no scan data has been received, the controller 31 waits until the scan data is received (No in step S200).

After the controller 31 has generated the file ID of the scan file, the controller 31 stores the received scan file (step S220). Then, the controller 31 transmits the file ID to the multifunction peripheral 10 (step S230), and ends the processing.

1.4 Operation Example

Next, an operation example of the first embodiment will be described.

1.4.1 Operation Regarding Index Assignment

Figure 8:
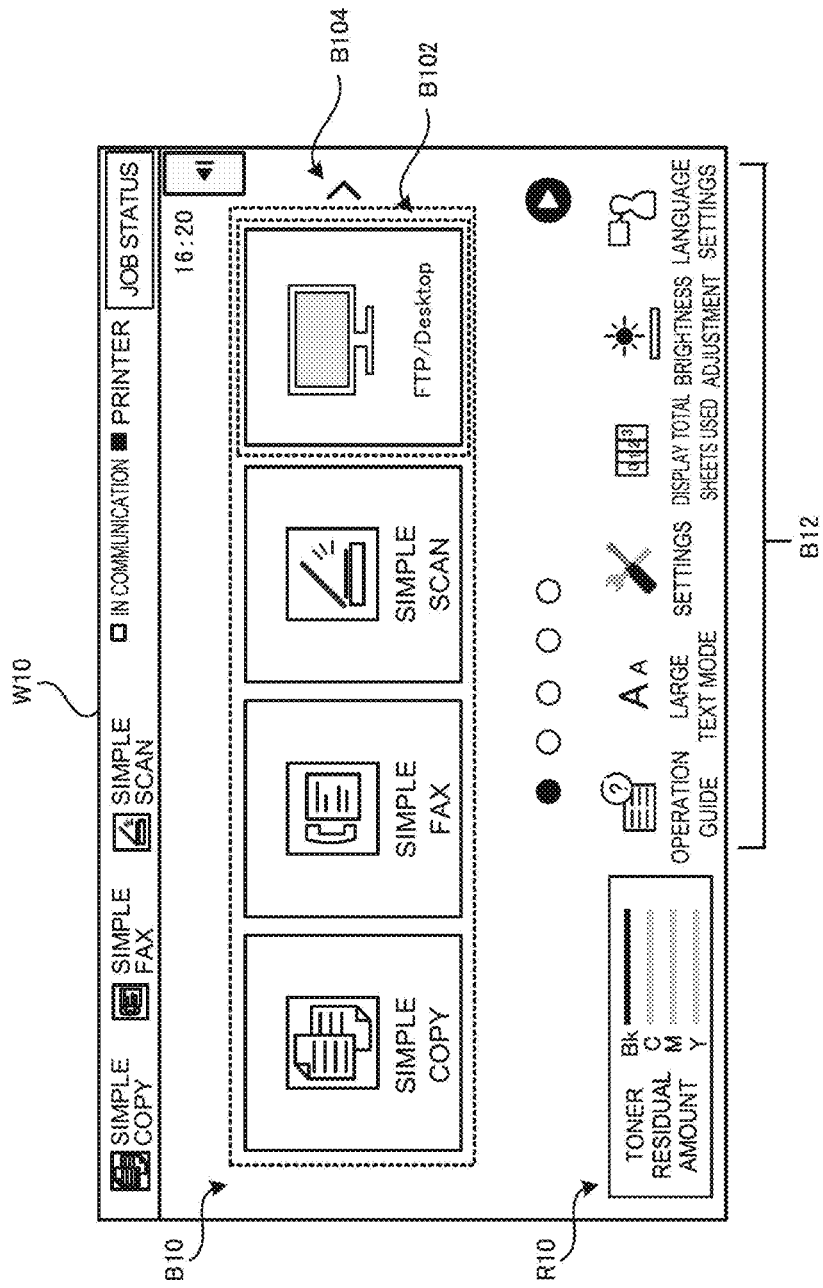
FIG. 8 is a diagram illustrating an operation example of the first embodiment.

FIG. 8 illustrates an example of a screen configuration of a home screen W10 that the multifunction peripheral 10 displays on the display 13. The home screen W10 is a basic screen that is displayed on the display 13 when, for example, power is turned on, or the multifunction peripheral is in a standby mode, or recovered from a sleep mode, and receives operation input from the user. The home screen W10 includes mode selection buttons B10, a device status display area R10, and function selection buttons B12.

The mode selection buttons B10 include a "Simple Copy" button, a "Simple Fax" button, a "Simple Scan" button, and an "FTP/Desktop" button B102, and receive selection of an operation mode executed by the multifunction peripheral 10. Here, the home screen W10 exemplified in FIG. 8 is a configuration example of selection buttons, which are related to operation modes assuming document reading as a trigger of the start of operation, consolidated on one screen. Selection buttons related to the other operation modes not illustrated in FIG. 8 can be displayed sequentially by pressing an arrow button B104 positioned on a lateral side of the "FTP/Desktop" button B102.

When the user presses any one of the selection buttons from the "Simple Copy" button, "Simple Fax" button, "Simple Scan" button, and "FTP/Desktop" button B102, the controller 11 displays a setting screen corresponding to each operation mode.

In the present specification, the "FTP/Desktop" button B102 is a selection button which receives input of an instruction to save the scan file. Pressing of the "FTP/Desktop" button B102 is an example of operation corresponding to the processing related to step S10 of FIG. 6. When the user presses the "FTP/Desktop" button B102, the controller 11 causes the screen to transition to a setting screen related to save of the scan file, which will be described referring to the subsequent figure.

The device status display area R10 is an area for displaying the device status of the multifunction peripheral 10. FIG. 8 illustrates an example in which the residual amount of toner is displayed in the device status display area R10.

The function selection buttons B12 are buttons that receive a change instruction, a reference instruction, or the like, pertaining to function settings of the multifunction peripheral 10. When pressing of the function selection button B12 is received, the controller 11 displays each setting screen, which is not illustrated, for executing the change instruction or the reference instruction for the corresponding function.

FIG. 9 illustrates an example of a screen configuration of an image transmission setting screen W20 that the controller 11 displays, in response to pressing of the "FTP/Desktop" button B102.

The image transmission setting screen W20 includes a destination input button B14, a destination display area R12, a subject (file name) input box Bx10, a setting information display area R14, and processing selection buttons B16.

The destination input button B14 is a button which receives input of a destination as a save location of the scan file. When the user presses the destination input button B14, the controller 11 displays the address book managed by the multifunction peripheral 10 itself as the management information. The user can select the desired destination as the save location of the scan file from the displayed address book. Not only can the destination be selected from the address book, but the destination can also be input directly via, for example, the operation inputter 15.

The destination input button B14 can receive input of not only the save location of the scan file, but also a fax number or an e-mail address for transmitting the same data as the scan data to be saved by fax or e-mail.

The destination display area R12 is a display area for displaying the destination that has been set as the save location of the scan file. FIG. 9 illustrates an example in which the user has selected or input the storage device 30 (NAS01) as the save location of the scan file, and a fax number for transmitting the same data as the scan data by fax is also input.

The subject (file name) input box Bx10 is a box used when adding a file name to the scan file to be saved or sent, or receiving input of the subject in performing transmission by fax or e-mail.

The setting information display area R14 is an area in which various kinds of setting information related to image transmission are displayed. The setting information display area R14 reflects and displays values of the setting values applied in execution of a job, and stored as history information.

The processing selection buttons B16 are buttons which receive selection of processing (action) desired by the user. As the user selects and presses a selection button corresponding to processing of various kinds of processing, such as "Search Global Address Book", "Transmission History", "Call by Search Number", "Create Search Index", "Transmit Link of Save Location", or "Transmit with Same Image as Fax Destination", the user can execute the processing corresponding to the selection button. A "Create Search Index" button B161 receives pressing thereof by the user when assigning index information (index) to the scan data to be saved. When pressing of the "Create Search Index" button B161 is received, the controller 11 displays a search index creation screen, which will be described referring to the subsequent figures.

The controller 11 performs control to display the "Create Search Index" button B161 within the processing selection buttons B16 when the controller 11 receives input of the save location of the scan file via the destination input button B14, and not to display the "Create Search Index" button B161 when the controller 11 does not receive input of the save location of the scan file. By performing such control, a limited display area for the processing selection buttons B16 can be used effectively. Of course, the controller 11 can also perform control to constantly display the "Create Search Index" button B161 within the processing selection buttons B16. The control related to display of the "Create Search Index" button B161 can be performed via, for example, a system setting screen, which is not illustrated.

Figure 10A:
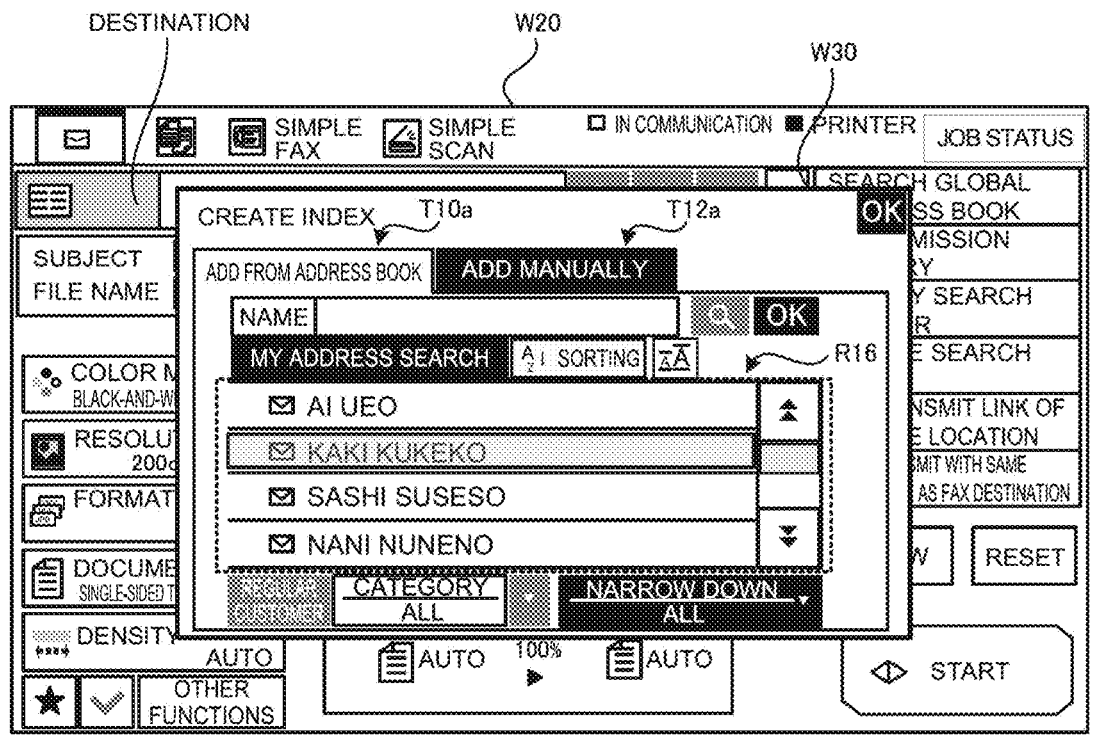
FIGS. 10A and 10B are diagrams illustrating an operation example of the first embodiment.
Figure 10B:
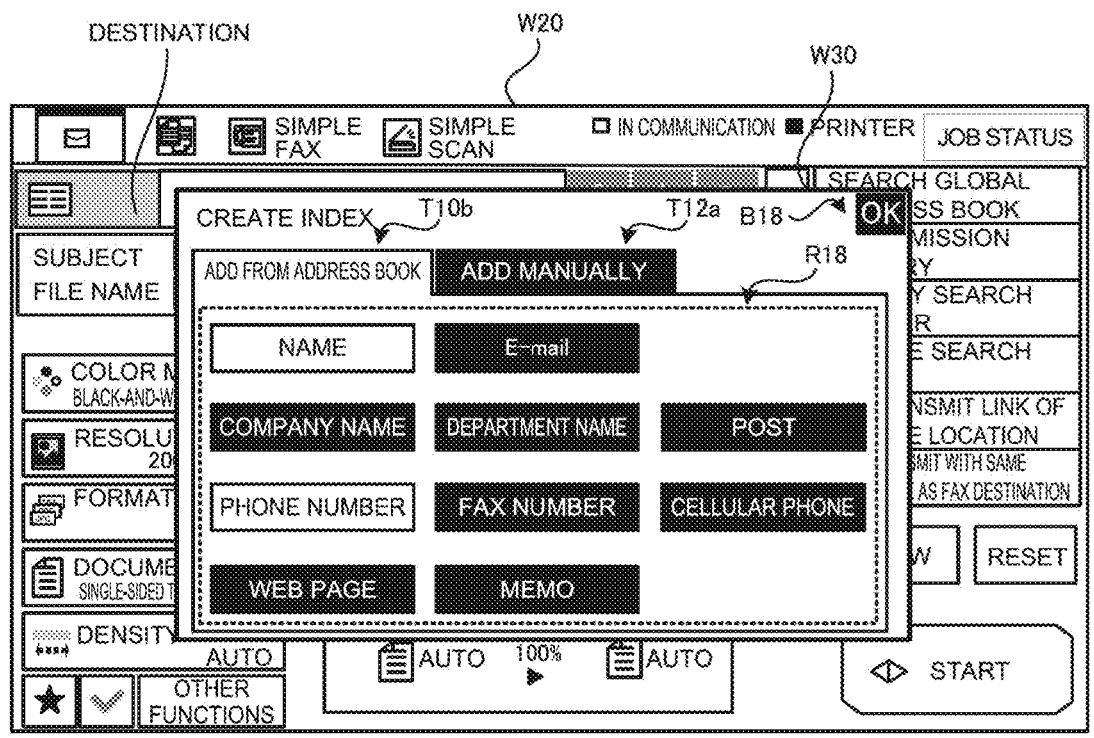

FIGS. 10A and 10B illustrate a configuration example of an index creation screen W30 that the controller 11 displays, in response to pressing of the "Create Search. Index" button B161. The index creation screen W30 includes a tab screen T10a and a tab screen T12a. Note that the user can switch display between the tab screen T10a and the tab screen T12a by pressing a tab portion of the two tab screens.

FIG. 10A illustrates an example of a screen configuration to be presented when the tab screen T10a is selected by the user. The tab screen T10a is a creation screen selected by the user when an index that is related to the address book as the management information is to be assigned to the scan data. The tab screen T10a includes at least an address information display area RIG for receiving selection of address information by the user.

The address information displayed in the address information display area R16 may be address information managed in the address book of the multifunction peripheral 10 itself, or address information received from the terminal device 50 or the information processing apparatus 70. Furthermore, the address information may be information to be managed by importing the address information received from the terminal device 50 or the information processing apparatus 70 into the address book of the multifunction peripheral 10 itself.

FIG. 10B illustrates an example of a screen configuration of a tab screen T10b that the controller 11 displays when the address information desired by the user (for example, "Kaki Kukeko") is selected from pieces of address information displayed in the address information display area R16. The tab screen T10b selectably displays, in an index assignment candidate display area R18, candidates for assignment of an index related to the address information "Kaki Kukeko", which has been selected in the address information display area R16.

FIG. 10B shows an example in which "Name" and "Phone Number" are selected from a plurality of index assignment candidates that are displayed in the index assignment candidate display area R18. In the figure, the selected index assignment candidates are denoted as a white square selection button. As the user selects the desired index assignment candidate, and presses an OK button B18, the user can make the setting of an index to be assigned to the scan data.

Meanwhile, when an index regarding address information is assigned to scan data, it is also possible to assign information regarding the scan data to the address information. By virtue of this feature, a search for address information also enables acquisition of information regarding the scan data linked to the address information in question.

Figure 11:
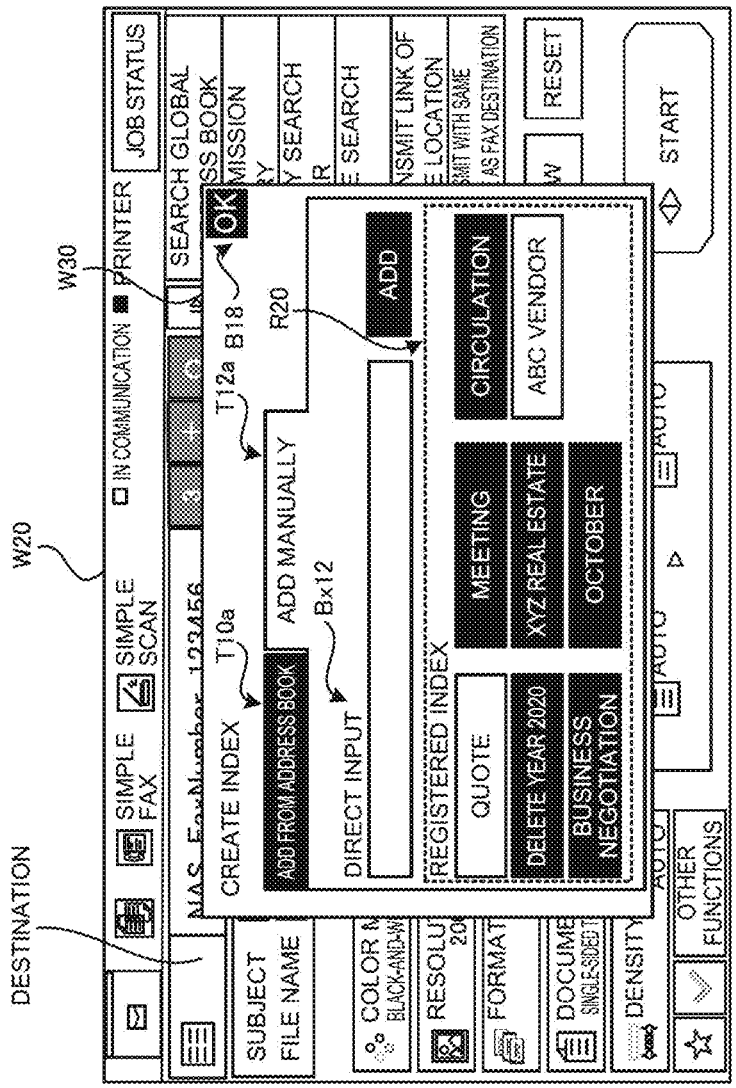
FIG. 11 is a diagram illustrating an operation example of the first embodiment.

FIG. 11 illustrates an example of a screen configuration to be presented when the tab screen T12a is selected by the user. The tab screen T12a is a creation screen selected by the user when an index as the second information, which is different from the index (the first information) related to the address book, is to be assigned to the scan data. The tab screen T12a includes at least a direct input box Bx12, and an already-registered index assignment candidate display area R20 in which index assignment candidates that have already been registered in the multifunction peripheral 10 are selectably displayed.

The direct input box Bx12 is a box to receive an index that the user wishes to assign by direct input. As the user inputs an index that he/she wishes to assign in the direct input box Bx12 as a free comment, and presses the Add button, the user can set the index to be assigned to the scan data.

FIG. 11 shows an example in which "Quote" and "ABC Vendor" are selected from a plurality of already-registered index assignment candidates that are displayed in the already-registered index assignment candidate display area R20. In the figure, the selected index assignment candidates are denoted as a white square selection button. As the user selects the desired index assignment candidate, and presses the OK button B18, the user can make the setting of an index to be assigned to the scan data.

1.4.2 Regarding Operation Related to Search of Scan Files to which Indexes are Assigned Next, a search of scan files to which indexes are assigned will be described.

Figure 12:
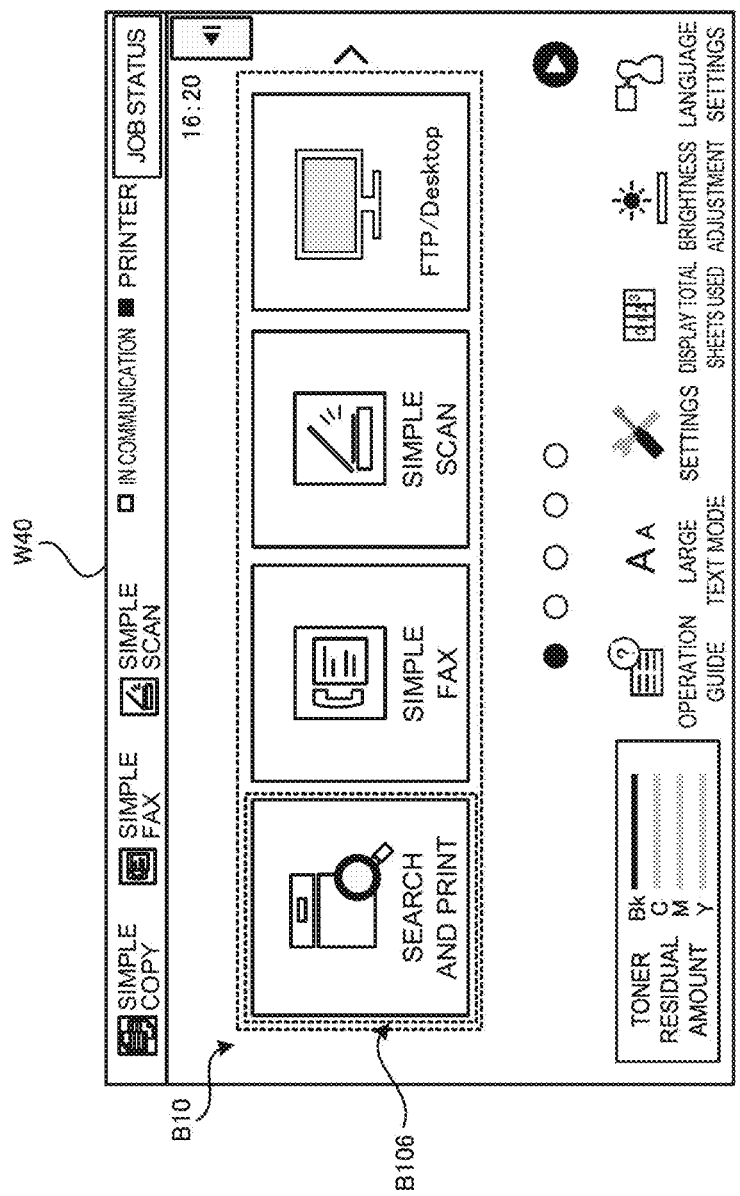
FIG. 12 is a diagram illustrating an operation example of the first embodiment.

A search of scan files to which indexes are assigned can be performed from a home screen. FIG. 12 illustrates an example of a screen configuration of a home screen W40 on which reception of search processing execution is enabled. Since the configuration of the home screen W40 can be made substantially the same as the home screen W10 indicated in FIG. 8, parts that are different will be described.

The home screen W40 includes a "Search and Print" button B106 in place of the "Simple Copy" button of the mode selection button B10 pertaining to the home screen W10. Note that the screen configuration indicated in FIG. 12 is merely an example, and the search processing according to the present disclosure is not limited to a print function. For example, by replacing the "Simple Fax" button with a "Search and Fax" button, and replacing the "Simple Scan" button with a "Search and E-mail" button, etc., a scan file obtained as a result of the search can be transmitted by fax or e-mail.

When pressing of the "Search and Print" button B106 is received, the controller 11 displays a print setting screen as illustrated by the subsequent figures.

Figure 13A:
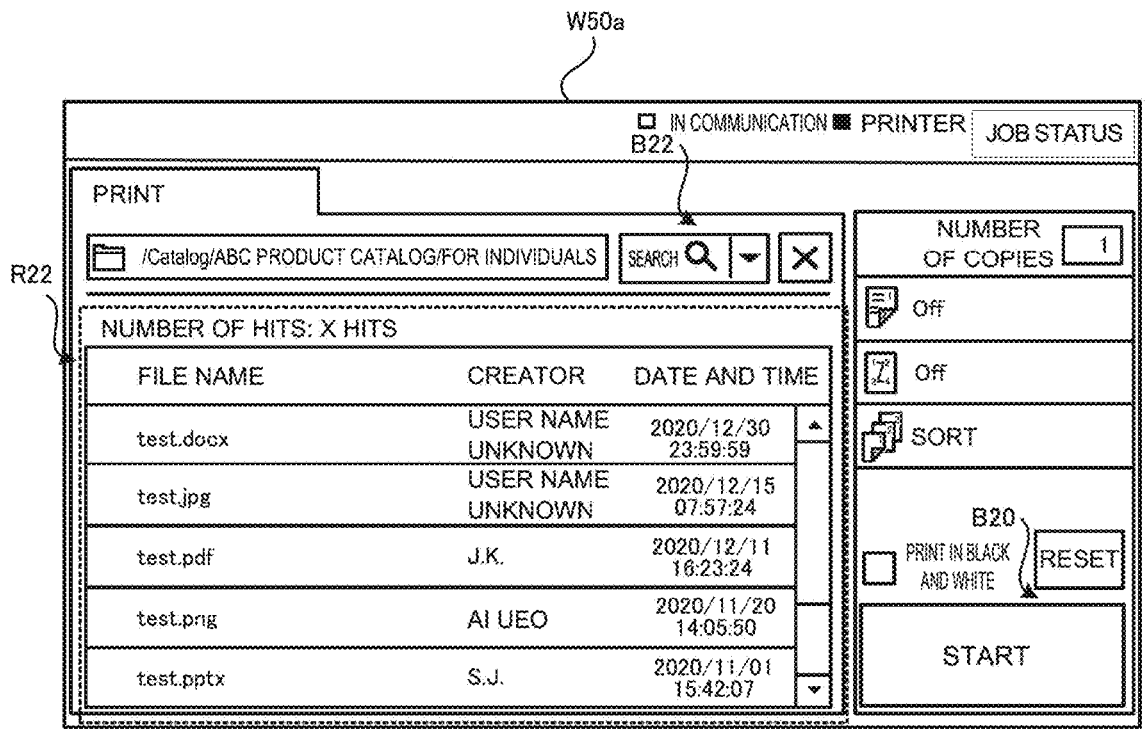
FIGS. 13A and 13B are diagrams illustrating an operation example of the first embodiment.

FIG. 13A illustrates an example of a screen configuration of a print setting screen W50a that the controller 11 displays, in response to pressing of the "Search and Print" button B106. The print setting screen W50a includes a search result display area R22, a start button B20, and a search button B22.

The search result display area R22 is an area for displaying search results of the scan files to which indexes are assigned. Each search result including the file name, creator name, etc., is configured to be selectable. As the user selects the desired search result, and presses the start button B20, printing of the scan file represented as the search result can be executed.

Figure 13B:
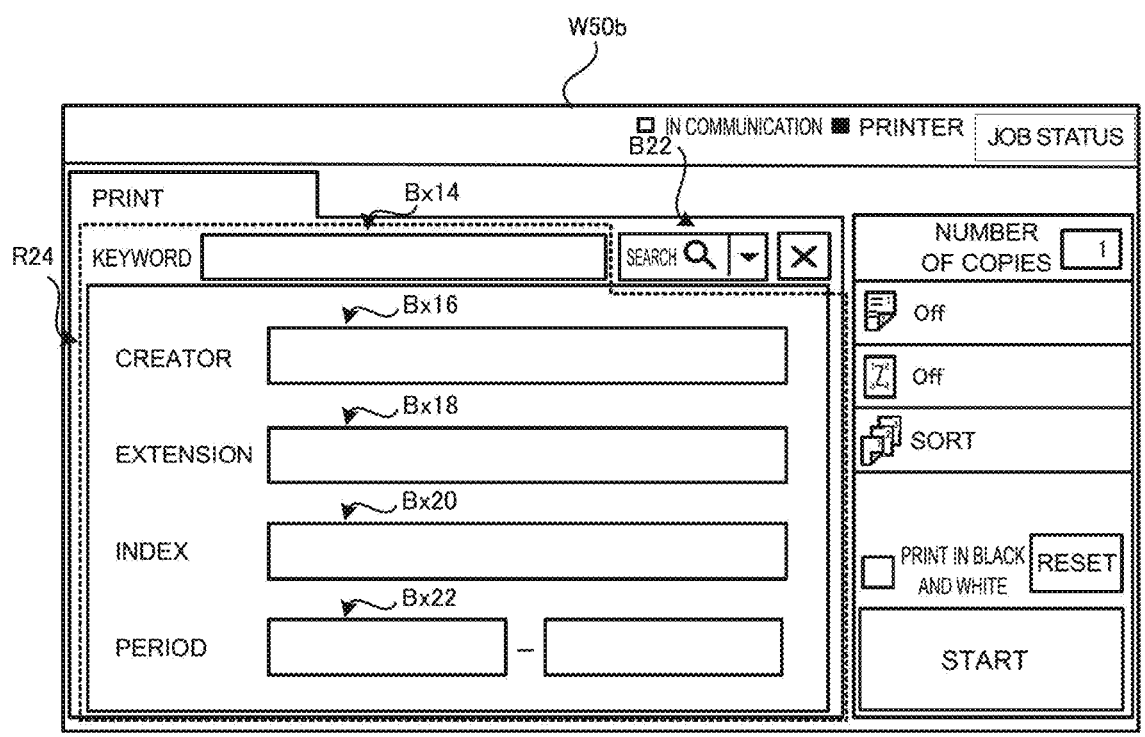

The search button B22 receives input of an instruction to search for scan files to which indexes are assigned. Also, when pressing of the down-arrow button provided in the search button B22 is received from the user, the controller 11 displays a print setting screen W50b illustrated in FIG. 13B.

The print setting screen W50b includes a search value input area R24. The search value input area R24 includes a keyword input box Bx14, a creator input box Bx16, an extension input box Bx18, an index input box Bx20, and a period input box Bx22. As the user inputs the desired search value, period, etc., in these input boxes, and presses the search button B22, a search of the scan file can be executed.

The keyword input box Bx14 is a box to receive input of a keyword as the search value of the scan file. In the keyword input box Bx14, an assigned index item can also be directly input.

The creator input box Bx16 is a box to receive input of the creator of a scan file as the search value of the scan file. The extension input box Bx18 is a box to receive input of a file extension of the scan file (e.g. PDF, JPEG, etc.) as the search value of the scan file. The index input box Bx20 is a box to receive input of the assigned index item as the search value of the scan file. The period input box Bx22 is a box to receive input of a scan file creation period.

FIG. 14A illustrates an example of a screen configuration of an input assistance screen W60 which assists with input of the index item to the index input box Bx20. The input assistance screen W60 can be displayed, for example, by a click or tap operation or the like in the box of the index input box Bx20. FIG. 14A shows an example in which the index items such as "AAA", "BBB CCC", "ABC Corporation" and "USA", for example, are selectably displayed. As the user selects a desired index from the displayed items and presses an OK button B24, he/she can make input to the index input box Bx20.

Further, FIG. 14B illustrates an example of a screen configuration of a period input assistance screen W70 which assists with input of the period input box Bx22. The period input assistance screen W70 can be displayed, for example, by a click or tap operation or the like in the box of the period input box Bx22. FIG. 14B shows an example in which the dates belonging to July 2020 are displayed in a calendar format such that the dates are selectable. As the user selects a desired "day" from the displayed dates belonging to July 2020, and presses the OK button B24, he/she can make input to the period input box Bx22.

Figure 15A:
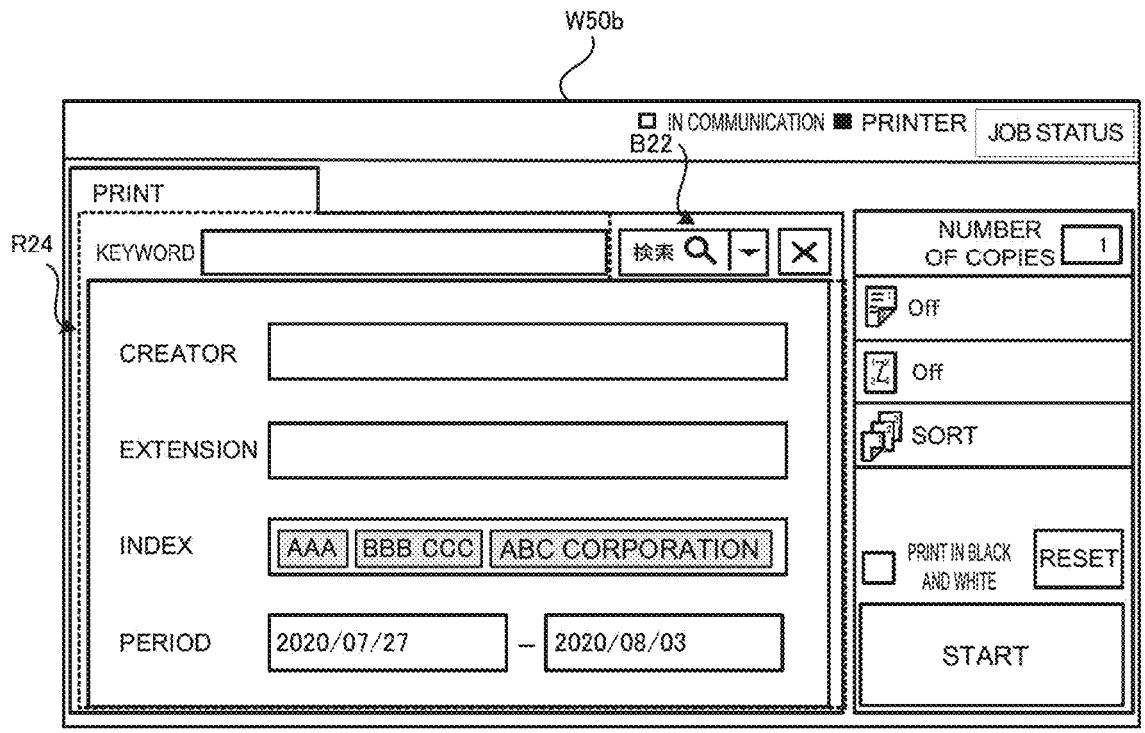
FIGS. 15A and 15B are diagrams illustrating an operation example of the first embodiment.

FIG. 15A shows an input example of the index item and the period, which have been input by using the input assistance screen W60 exemplified in FIG. 14A, and the period input assistance screen W70 exemplified in FIG. 14B. FIG. 15A illustrates an example in which three items, which are "AAA", "BBB CCC", and "ABC Corporation", have been selected as the index items via the input assistance screen W60, and the period "Jul. 27, 2020 to Aug. 3, 2020" has been selected as the scan file creation period via the period input assistance screen W70. As indicated in FIG. 15A, the index input box Bx20 is configured to allow a plurality of index items to be simultaneously selected. As the user completes inputs to the search value input area R24, and presses the search button B22, he/she can execute a search of the scan file.

Figure 15B:
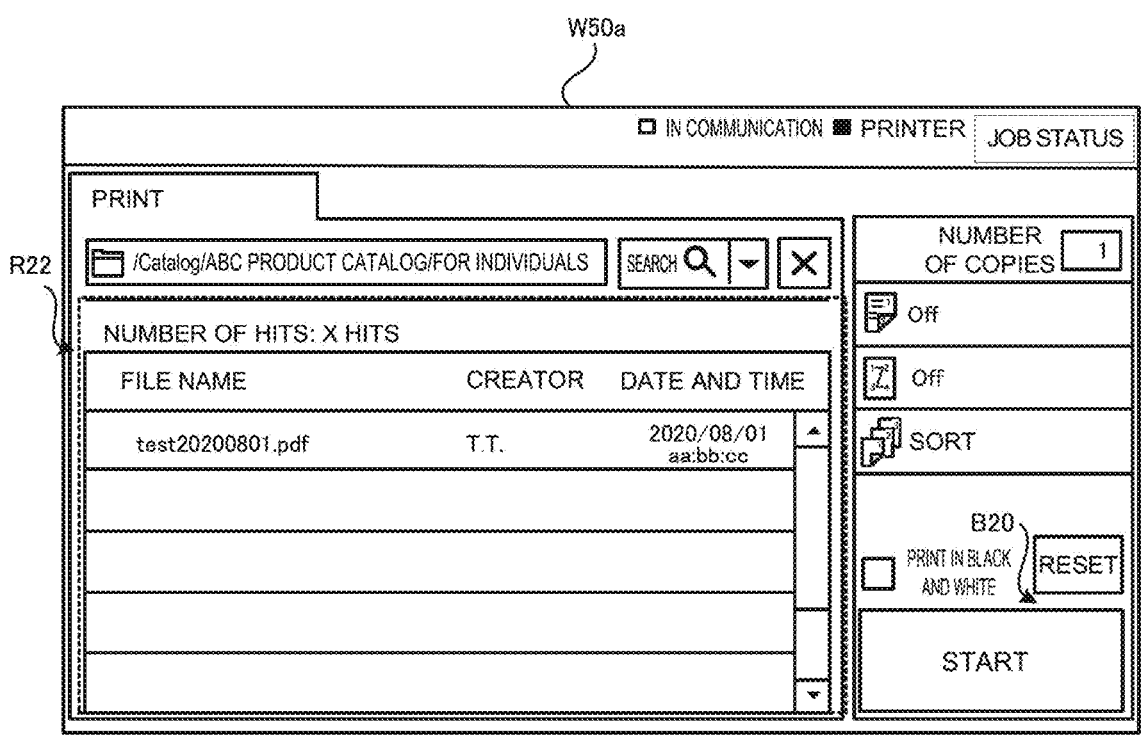

FIG. 15B illustrates an example of a screen configuration of the print setting screen W50a, which displays a result of the search of the scan file that has been executed via the print setting screen W50b of FIG. 15A. As indicated in FIG. 15B, a result of the search of the scan file is displayed in the search result display area R22. When it is confirmed by the user that the result of the search indicates the desired scan file, he/she can select the confirmed search result, and press the start button B20, thereby executing printing based on the scan file in question.

As described above, according to the first embodiment, it is possible to provide a storage method, for example, which enables the user operability to be improved in storage or search of a scan file, and with which a strain on the storage capacity of storage can be suppressed.

In addition, according to the first embodiment, it is possible to assign highly flexible indexes such as indexes regarding address information, already-registered indexes, or indexes of free words, which are different from the information held by the file itself. These indexes can be used for artificial intelligence (AI) search such as position-aware search, fuzzy search, and semantic search, and tag creation for the AI search is also easy. Therefore, a value can be added to the AI search functionality.

2. Second Embodiment

A second embodiment takes the form in which the multifunction peripheral includes the file storage area that is provided in the storage device according to the first embodiment.

2.1 Functional Configuration

2.1.1 Regarding Multifunction Peripheral 90

Figure 16:
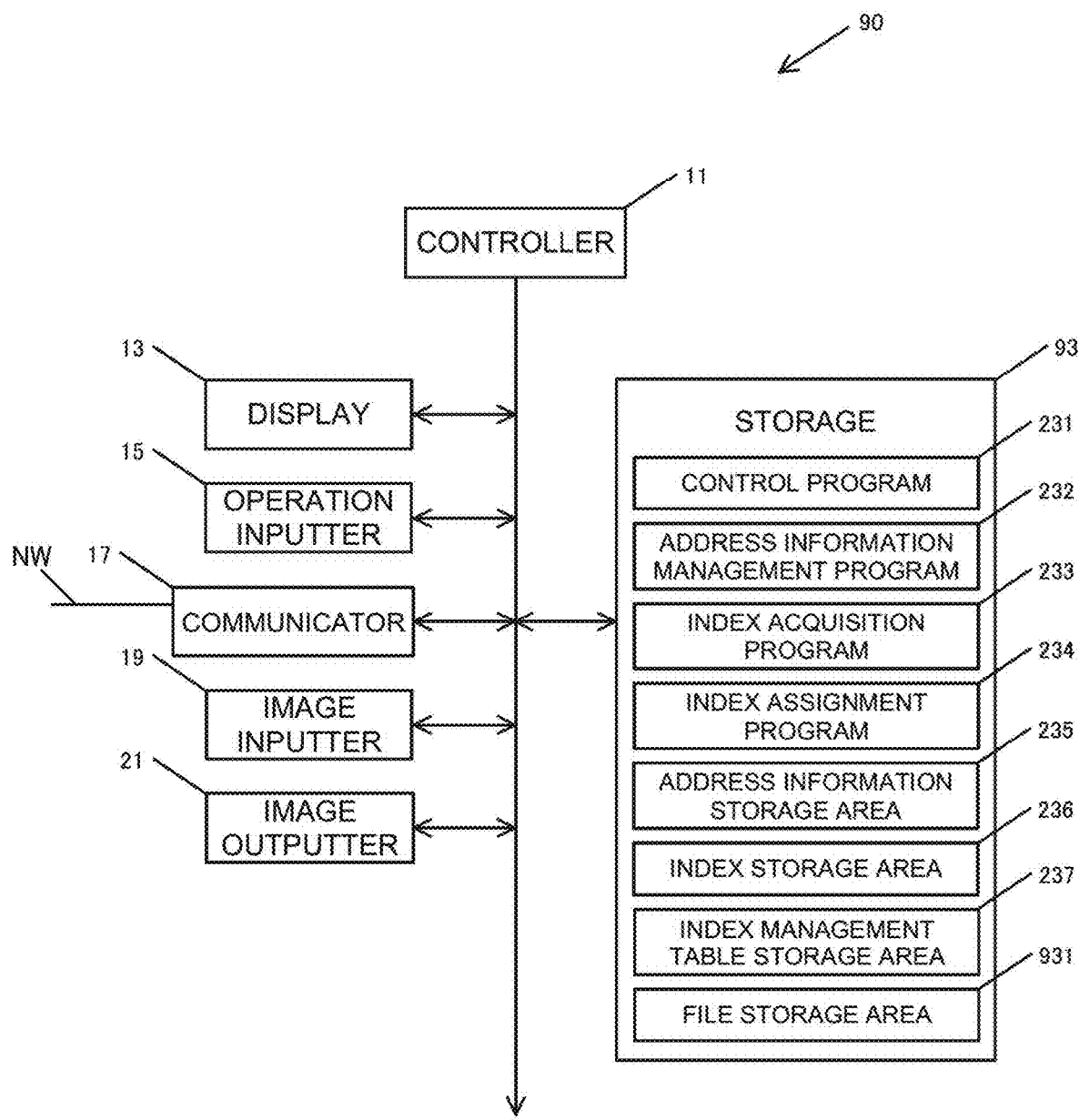
FIG. 16 is a diagram of a functional configuration of a multifunction peripheral according to a second embodiment.

FIG. 16 is a diagram illustrating a functional configuration of a multifunction peripheral 90. The multifunction peripheral 90 includes a storage 93 in place of the storage 23 of the multifunction peripheral 10 according to the first embodiment. Configurations other than the storage 93 can be made similar to those of the multifunction peripheral 10. Therefore, the same configurations as those of the first embodiment are denoted by the same reference numerals, and description thereof is omitted.

In addition to the constituent elements of the storage 23 according to the first embodiment, the storage 93 reserves a file storage area 931 as an internal storage device. The file storage area 931 is a storage area for storing scan data to which an index is assigned as a scan file.

2.2 Flow of Processing

Figure 17:
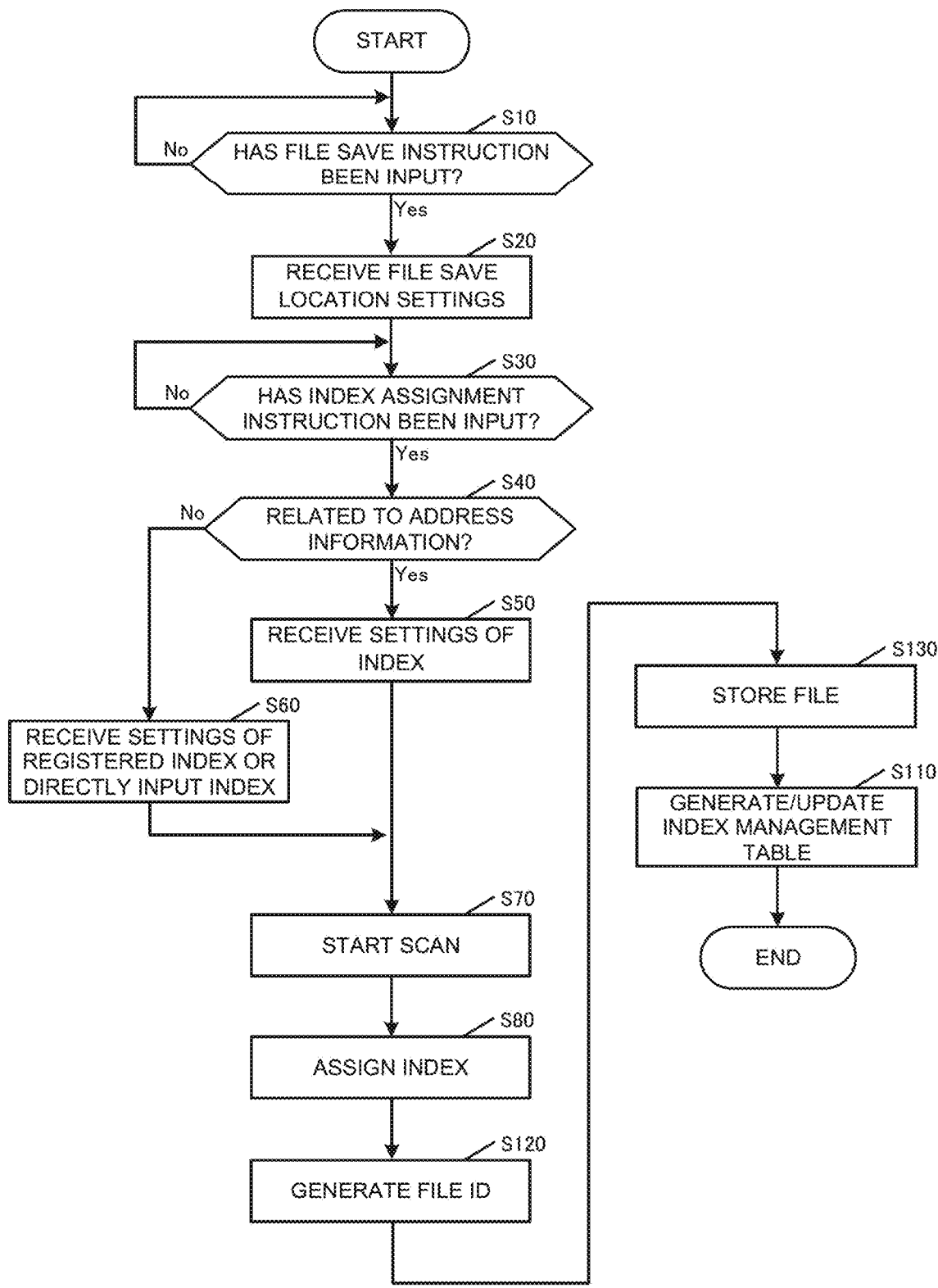
FIG. 17 is a diagram illustrating a flow of processing of the second embodiment.

FIG. 17 is a flowchart illustrating the flow of processing of the multifunction peripheral 90. The flow of processing to be executed by the multifunction peripheral 90 is the same as that described referring to the flowchart of FIG. 6 of the first embodiment except that the processing of step S90 and step S100 of the first embodiment is replaced with the processing of step S120 and step S130, respectively. That is, the other processing can be performed in the same way as in the first embodiment.

More specifically, after a controller 11 of the multifunction peripheral 90 assigns an index to scan data that has been generated, the controller 11 generates a file ID (move from step S80 to step S120).

Next, the controller 11 stores the scan data in the file storage area 931 as a scan file (step S130).

If an index management table is not generated, the controller 11 generates a relevant index management table. Meanwhile, if an index management table has already been generated, the controller 11 updates the index management table, and ends the processing (step S110).

Since an operation example according to the second embodiment is similar to that of the first embodiment, the operation example will not be described here.

According to the configuration of the second embodiment as described above, advantages in addition to those of the first embodiment can be obtained. That is, since the second embodiment is configured to store scan data to which an index is assigned as a scan file, there is no need to provide a storage device externally, and it is possible to obtain the advantages of being able to simplify the system and reduce the cost.

3. Third Embodiment

A third embodiment takes the form of assigning an index after storing a scan file in a storage device.

3.1 Functional Configuration

3.1.1 Regarding Multifunction Peripheral 100

Figure 18:
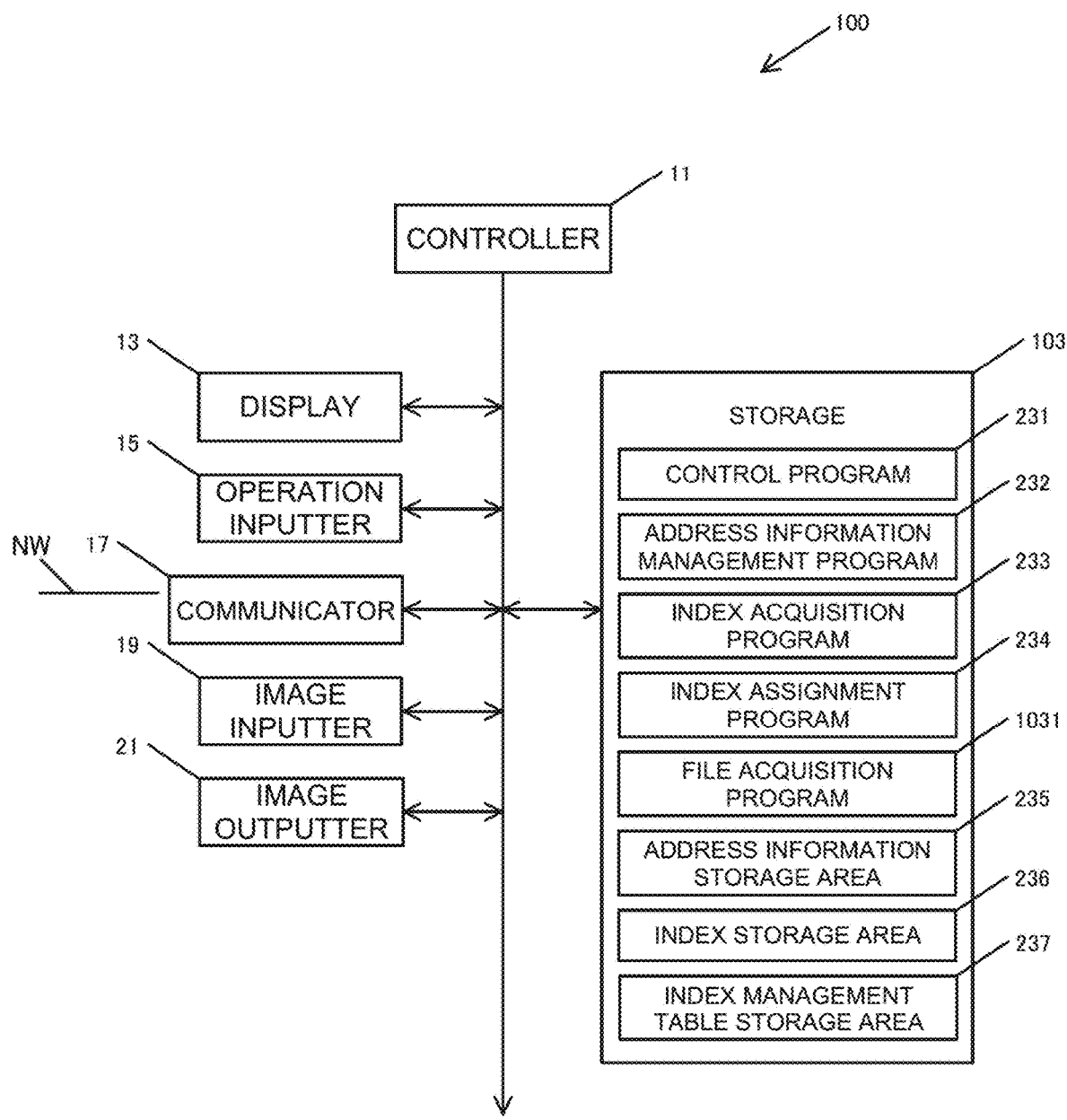
FIG. 18 is a diagram of a functional configuration of a multifunction peripheral according to a third embodiment.

FIG. 18 is a diagram illustrating a functional configuration of a multifunction peripheral 100. The multifunction peripheral 100 includes a storage 103 in place of the storage 23 of the multifunction peripheral 10 according to the first embodiment. Configurations other than the storage 103 can be made similar to those of the multifunction peripheral 10. Therefore, the same configurations as those of the first embodiment are denoted by the same reference numerals, and description thereof is omitted.

In addition to the constituent elements of the storage 23 according to the first embodiment, the storage 103 stores therein a file acquisition program 1031. The file acquisition program 1031 is a program that a controller 11 reads when acquiring a scan file to which an index is to be assigned from a storage device 30. The controller 11 which has read the file acquisition program 1031 refers to a file ID acquired from the storage device 30 that stores the scan file, and acquires the scan file from the relevant storage device 30.

3.2 Flow of Processing

Figure 19:
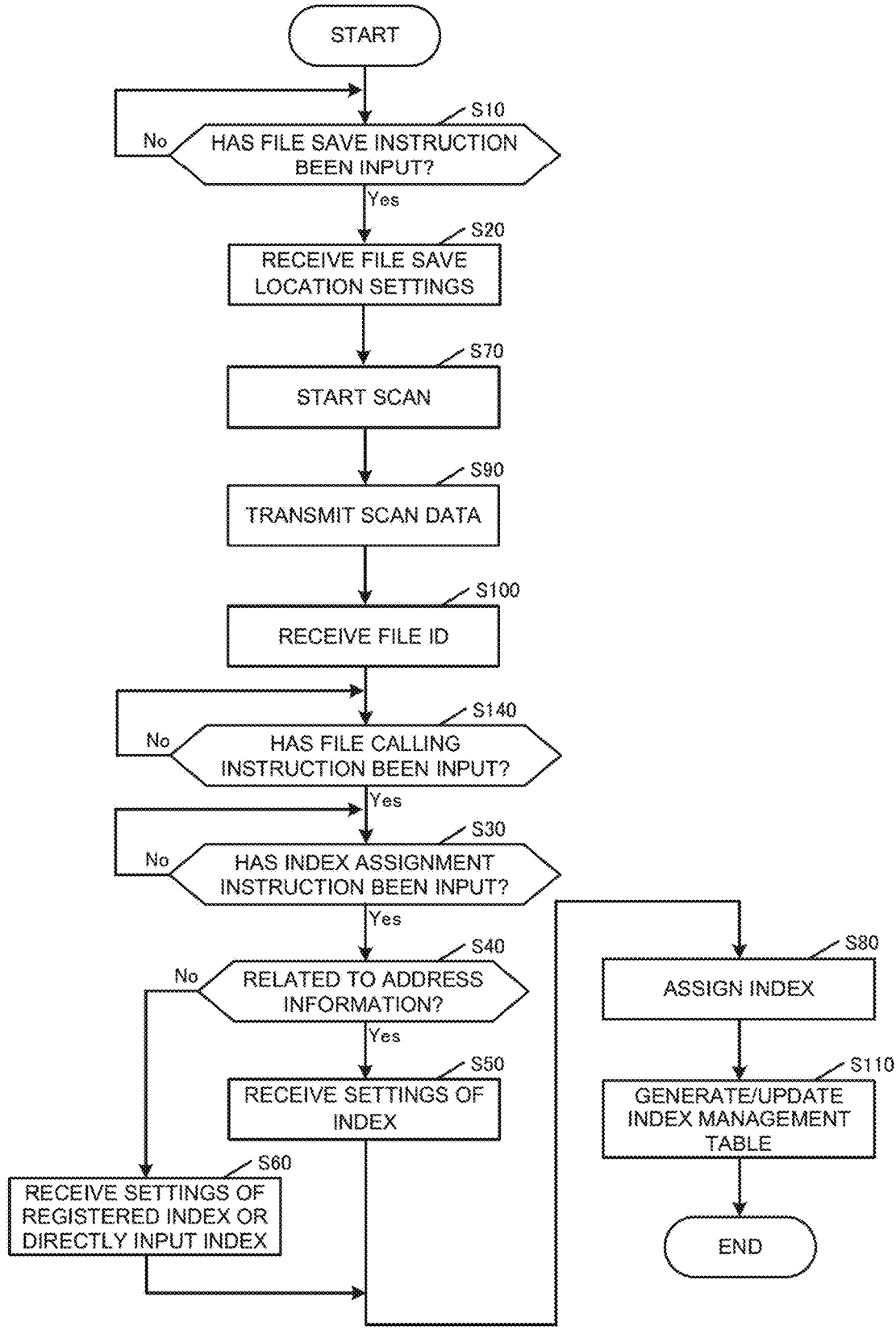
FIG. 19 is a diagram illustrating a flow of processing of the third embodiment.

FIG. 19 is a flowchart illustrating the flow of processing of the multifunction peripheral 100. Processing steps that are the same as those described with reference to the flowchart of FIG. 6 of the first embodiment are denoted by the same step number, and description thereof is omitted.

When save location settings for a scan file are received from the user, the controller 11 starts a scan (move from step S20 to step S70).

Next, the controller 11 transmits the generated scan data to the storage device 30 set as the scan file save location, which has been received in step S20 (step S90).

When the scan file is stored in the storage device 30, which is the transmission destination of the scan data, and a file ID is issued, the controller 11 receives the file ID (step S100).

The controller 11 reads the file acquisition program 1031. The controller 11 that has read the file acquisition program 1031 determines whether or not the user has input a file calling instruction (step S140). If it is determined that the file calling instruction has been input, the controller 11 determines whether or not an instruction to assign an index has been input (if step S140 is Yes, then go to step S30). Meanwhile, if it is determined by the controller 11 that no file calling instruction has been input, the controller 11 waits until the calling instruction is input (No in step S140).

When the file calling instruction is input, the controller 11 may acquire the scan file itself from the storage device 30 that stores the scan file. Alternatively, it is also possible to adopt a mode in which the controller 11 only specifies the scan file to which an index is to be assigned, and transmits the index to be assigned to the storage device 30 so that the storage device 30 assigns the index. Furthermore, it is possible to store, in step S70, the scan data (or a copy of the scan data) generated by the scan, and have the scan data with an index assigned thereto transmitted to the storage device 30. In this case, as the scan file previously stored in the storage device 30 is overwritten by an overwrite save, it is possible to have the scan file to which an index is assigned stored in the storage device 30.

If it is determined that the instruction to assign an index has been input, the controller 11 determines whether or not the index corresponds to the first information related to address information (if step S30 is Yes, then go to step S40).

If it is determined that the index to be assigned corresponds to the first information related to address information, the controller 11 displays a selection screen to receive selection/input of the index, and receives settings of the index (if step S40 is Yes, then go to step S50).

Meanwhile, if it is determined that the index to be assigned does not correspond to the first information related to address information, the controller 11 displays a selection screen to receive selection/input of the second information as the index, and receives settings of the index (a registered index or a directly input index) (if step S40 is No, then go to step S60).

The controller 11 assigns the index set in step S50 or step S60 to the scan data corresponding to the scan file called in step S140 (step S80).

Further, if an index management table is not generated, the controller 11 generates a relevant index management table. Meanwhile, if an index management table has already been generated, the controller 11 updates the index management table, and ends the processing (step S110).

3.3 Operation Example

Figure 20:
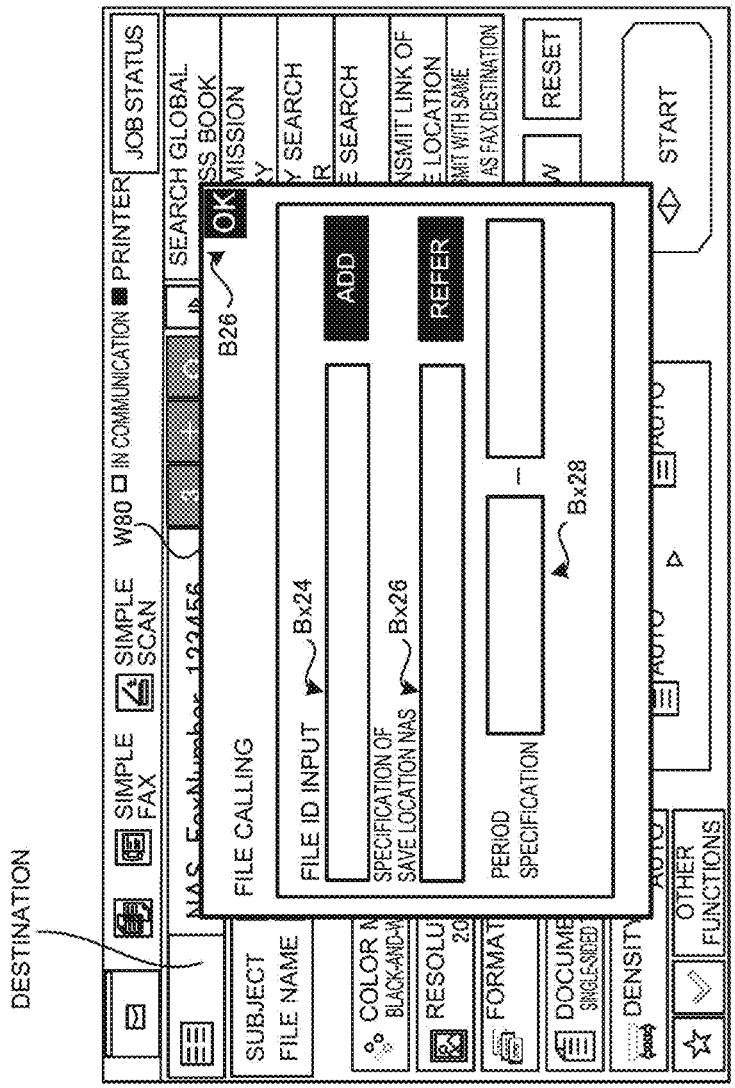
FIG. 20 is a diagram illustrating an operation example according to the third embodiment.

FIG. 20 illustrates an example of a screen configuration of a call screen W80 to receive input of the file calling instruction related to step S140 of FIG. 19. The call screen W80 includes a file ID input box Bx24, a save location NAS specification box Bx26, a period specification input box Bx28, and an OK button B26.

The file ID input box Bx24 is a box to receive input of the file ID which has been received in step S100 of FIG. 19 from the storage device 30 that stores the scan file.

The save location NAS specification box Bx26 is a box to receive specification of the storage device 30 from which the scan file is to be acquired by input of, for example, the name of the storage device 30 that stores the scan file, or the position on a network (e.g., an IP address or a MAC address), an URL, or a host name of the same.

The period specification input box Bx28 is a box to receive input of a search period of the scan file to be searched for.

As the user makes input to some of or all of the input boxes and presses the OK button B26, a desired scan file can be called.

According to the third embodiment as described above, not only can the advantages of the first embodiment be obtained, but it is also possible to perform more flexible file management in cases such as when an index is forgotten to be assigned to scan data, or assignment of an index happens to be needed in saving a scan file.

The storage method, for example, according to the present disclosure does not require folder sorting related to storage (save) of a file, and creation of duplicate data (separate management of the same data) is not required either. Further, since linking an address book to the scan data on the basis of an individual or a group is also possible, according to the present disclosure, it is possible to provide a more flexible and easily operable storage/search tool.

The present disclosure is not limited to the embodiments described above, and various modifications can be made. That is, an embodiment obtained by combining technical means modified as appropriate without departing from the spirit of the present disclosure is also included in the technical scope of the present disclosure.

Further, although there are some parts in the above embodiments that are described separately for convenience of explanation, it is needless to say that the embodiments may be combined within the technically possible range and implemented.

In addition, the program to be operated on each of the devices in the embodiments is a program which controls the CPU or the like (i.e., a program which makes a computer function) so as to implement the functions of the above-described embodiments. Further, the information handled by these devices is temporarily accumulated in a temporary storage device a RAM) during the processing, is then stored in various storage devices such as a read-only memory (ROM) and an HDD, and is read, corrected, and written by the CPU as needed.

Here, a recording medium that stores the program may be, for example, any of a semiconductor medium (for example, a ROM or a non-volatile memory card), an optical recording medium/magneto-optical recording medium (for example, a digital versatile disc (DVD), a magneto-optical disc (MO), a Mini Disc (MD), a compact disc (CD), or a Blu-ray (registered trademark) Disc (BD)), and a magnetic recording medium (for example, a magnetic tape or a flexible disk). Further, not only are the functions of the above-described embodiments implemented by execution of the loaded program, but the functions of the present disclosure may also be implemented by processing performed in cooperation with an operating system or other application programs, etc., on the basis of the instructions of the program.

Furthermore, when the program is to be distributed to the market, the program may be stored in a portable recording medium for distribution or transferred to a server computer connected via a network such as the Internet. In this case, a storage device of the server computer is also included in the present disclosure as a matter of course.

What is claimed is:

1. A storage method comprising:
   determining whether instructions, for adding index information different from information that is based on a document to scan data generated by scanning the document with a reading device, are inputted;
   accepting, after the instructions are determined to be inputted, a selection of the index information for adding to the scan data;
   determining whether the selected index information is related to management information managed by the reading device;
   accepting, after the selected index information is determined to be related to the management information, a selection input of first information, which is related to the management information, as the index information for adding to the scan data;
   generating the scan data by scanning of the document with the reading device; and
   assigning, as the index information, the first information accepted by the selection input to the generated scan data and storing the generated scan data with the index information in a storage device,
   wherein the first information includes any one account of at least a personal name, a phone number, an e-mail address, a fax number, a home or place of work address, a name of a place of work, a post, a (Uniform Resource Locator (URL) and a (Social Networking Service (SNS).

2. The storage method according to claim 1, further comprising:
   accepting, after the selected index information is determined not to be related to the management information, a selection input of second information, different from the first information, as the index information for adding to the scan data; and
   assigning, as the index information, the second information accepted by the selection input to the generated scan data and storing the generated scan data with the index information in the storage device.

3. The storage method according to claim 2, wherein the second information includes at least one of words and phrases registered in advance in the reading device and a character string directly input to the reading device.

4. The storage method according to claim 1, wherein the assigning of the index information to the generated scan data is performed via an operation receiver of the reading device.

5. The storage method according to claim 1, wherein the storage device is an external storage device.

6. The storage method according to claim 1, wherein the storage device is an internal storage device provided in the reading device.

7. The storage method according to claim 1, wherein the index information is assigned after the generated scan data is stored in the storage device.

8. A storage system comprising a reading device including a reader and a controller, and a storage device,
   the controller determining whether instructions, for adding index information different from information that is based on a document to scan data generated by scanning the document with a reading device, are inputted,
   the controller accepting, after the instructions are determined to be inputted, a selection of the index information for adding to the scan data,
   the controller determining whether the selected index information is related to management information managed by the reading device,
   the controller accepting, after the selected index information is determined to be related to the management information, a selection input of first information, which is related to the management information, as the index information for adding to the scan data,
   the reader generating the scan data by scanning of the document,
   the controller assigning, as the index information the first information accepted by the selection input to the generated scan data and transmitting the generated scan data with the index information to the storage device, and
   the storage device storing therein the generated scan data to which the index information is assigned,
   wherein the first information includes any one account of at least:
   a personal name, a phone number, an e-mail address, a fax number, a home or place of work address, a name of a place of work, a post, a Uniform Resource Locator (URL) and a Social Networking Service (SNS).

9. A reading device comprising a reader, a storage, and a controller,
   the controller determining whether instructions, for adding index information different from information that is based on a document to scan data generated by scanning the document with a reading device, are inputted,
   the controller accepting, after the instructions are determined to be inputted, a selection of the index information for adding to the scan data, the controller determining whether the selected index information is related to management information managed by the reading device, the controller accepting, after the selected index information is determined to be related to the management information, a selection input of first information, which is related to the management information, as the index information for adding to the scan data, the reader generating the scan data by scanning of the document, and the controller assigning, as the index information the first information accepted by the selection input to the generated scan data and storing the generated scan data with the index information in the storage, wherein the first information includes any one account of at least:

a personal name, a phone number, an e-mail address, a fax number, a home or place of work address, a name of a place of work, a post, a Uniform Resource Locator (URL) and a Social Networking Service (SNS).

10. An image processing apparatus comprising the reading device according to claim 9, and an image processor which performs predetermined image processing on the generated scan data.

11. The storage method according to claim 1, further comprising:

displaying the management information as one or more candidates; and assigning the management information selected from the one or more candidates displayed, as index information, to the generated scan data.

* * * * *